(12) United States Patent
Yuki et al.

(10) Patent No.: US 8,998,475 B2
(45) Date of Patent: Apr. 7, 2015

(54) LIGHTING SYSTEM AND DISPLAY DEVICE

(75) Inventors: Ryuzo Yuki, Osaka (JP); Takeshi Ishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 55 days.

(21) Appl. No.: 14/110,765

(22) PCT Filed: Apr. 12, 2012

(86) PCT No.: PCT/JP2012/060005
§ 371 (c)(1),
(2), (4) Date: Oct. 9, 2013

(87) PCT Pub. No.: WO2012/144409
PCT Pub. Date: Oct. 26, 2012

(65) Prior Publication Data
US 2014/0029300 A1    Jan. 30, 2014

(30) Foreign Application Priority Data

Apr. 19, 2011 (JP) .................................. 2011-093436

(51) Int. Cl.
*F21V 7/04* (2006.01)
*F21V 8/00* (2006.01)

(52) U.S. Cl.
CPC .............. *G02B 6/0055* (2013.01); *G02B 6/002* (2013.01); *G02B 6/0036* (2013.01); *G02B 6/0038* (2013.01)

(58) Field of Classification Search
CPC .............. G02B 6/0033–6/0038; G02B 6/0055; G02B 6/0013–6/0018; G02B 6/002; G02B 6/0023; G02B 6/0031; G02F 1/133615
See application file for complete search history.

(56) References Cited

U.S. PATENT DOCUMENTS

| | | | |
|---|---|---|---|
| 6,867,828 B2* | 3/2005 | Taira et al. ...................... | 349/65 |
| 8,480,266 B2* | 7/2013 | Futami .......................... | 362/298 |
| 2004/0207775 A1* | 10/2004 | Min et al. ....................... | 349/65 |
| 2006/0109684 A1* | 5/2006 | Nesterenko et al. ........... | 362/610 |
| 2006/0126142 A1* | 6/2006 | Choi ............................... | 359/15 |
| 2008/0158912 A1* | 7/2008 | Chang et al. .................. | 362/628 |
| 2011/0255305 A1* | 10/2011 | Chen et al. .................... | 362/619 |
| 2011/0299013 A1 | 12/2011 | Ishida et al. | |
| 2012/0268687 A1* | 10/2012 | Kaida ............................. | 349/61 |

FOREIGN PATENT DOCUMENTS

| | | |
|---|---|---|
| JP | 2002-169034 A | 6/2002 |
| JP | 2005-085580 A | 3/2005 |
| WO | 2010/100784 A1 | 9/2010 |

OTHER PUBLICATIONS

Official Communication issued in International Patent Application No. PCT/JP2012/060005, mailed on Jul. 17, 2012.

* cited by examiner

*Primary Examiner* — Julie Bannan
(74) *Attorney, Agent, or Firm* — Keating & Bennett, LLP

(57) ABSTRACT

A plurality of prisms 23e which make an input angle of light from an LED 21 with respect to a rear surface of a light guiding body 23 gradually small are provided on a light emission plane 23b of the light guiding body 23, and a plurality of prisms 24b which cause the light from the LED 21 to be totally reflected to front in an interface between a rear surface of a low refractive index layer 24 and an air layer are provided on the rear surface of the light guiding plate 22. The light guiding plate 22 further includes an inclined plane 30 which is inclined to an optical axis O of the light from the LED 21. The inclined plane 30 is configured so as to cause input light to be reflected in the direction which is close to the optical axis O.

10 Claims, 21 Drawing Sheets

(A) INITIAL STATE (B) AFTER REFLECTING ON INCLINED PLANE

EXAMPLE

COMPARISON EXAMPLE

LIGHTING SYSTEM AND DISPLAY DEVICE

TECHNICAL FIELD

The present invention relates to a lighting system and a display device, and particularly, to a lighting system on which a light guiding member which guides light is mounted, and a display device which includes the lighting system.

BACKGROUND ART

In a liquid crystal display device (display device) on which a non-emission type liquid crystal display panel (display panel) is mounted, usually a backlight unit (lighting system) which supplies light to the liquid crystal display panel is also mounted thereon. It is preferable that the backlight unit is configured so as to generate sheet-shaped light which diffuses all over a planar liquid crystal display panel. For this reason, there is a case in which the backlight unit which is mounted on the liquid crystal display panel includes a light guiding plate (light guiding member) for effectively mixing light from a light source which is built therein.

As a backlight unit which includes a light guiding plate, for example, an edge light-type (side light-type) backlight unit has been known. In general, the edge light-type backlight unit has a configuration in which a light source such as a Light Emitting Diode (LED), or the like, is arranged on the side surface of a light guiding plate. In the backlight unit having such a configuration, light which is emitted from a light source is input to the inside of the light guiding plate from the side surface of the light guiding plate, and the input light is emitted to the liquid crystal display panel side by being guided in the light guiding plate.

Here, when a point light source such as an LED is used as a light source in the edge light-type backlight unit, it is difficult to make light uniformly input to a wide light guiding plate. For this reason, in a backlight unit in which the LED is used as the light source, uneven luminance easily occurs.

For this reason, in the related art, a lighting system which is capable of obtaining uniform emission light even when a point light source such as an LED is used has been proposed (for example, refer to PTL 1).

In PTL 1, a lighting system in which a trapezoidal shape is protruded at a position corresponding to a point light source in a light guiding plate, and through holes of a triangular shape or a trapezoidal shape which is symmetric are provided in the trapezoidal shape is disclosed. In the lighting system, light which is input to the light guiding plate is horizontally diffused by reflecting the light from a light source on the protruded trapezoidal side surface, or on the side surface of the through hole. In this manner, it is possible to obtain more uniform emission light.

CITATION LIST

Patent Literature

PTL 1: Japanese Unexamined Patent Application Publication No. 2002-169034

SUMMARY OF INVENTION

Technical Problem

However, in a lighting system in the related art in PTL 1, it is necessary to provide a plurality of optical sheets in order to improve luminance by condensing light from a light guiding plate in the front (display panel side). For this reason, there is inconvenience that thickness of a lighting system and a display device becomes large by thickness of the optical sheet. Due to this, there is a problem in that it is difficult to make a lighting system and a display device thin. In addition, there is also a problem in that manufacturing cost increases by providing the optical sheet.

In addition, in the lighting system in the related art, since light which is emitted from a light guiding plate passes through a plurality of optical sheets, there also is inconvenience that light loss occurs when the light passes through each optical sheet. For this reason, due to increasing in the light loss, there also is a problem in that use efficiency of the light decreases.

The invention has been made in order to solve the above described problems, and an object of the invention is to provide a lighting system and a display device which are capable of improving use efficiency and luminance of light while suppressing uneven luminance.

Another object of the invention is to provide a lighting system and a display device which are thin, and of which cost is reduced.

Solution to Problem

In order to achieve the above described objects, a lighting system in the present invention includes a light source, and a light guiding member for guiding light from the light source. The light guiding member is configured by a light guiding body to which light from the light source is input, a low refractive index layer which is provided on a rear surface of the light guiding body without an air layer, and of which a refractive index is lower than that of the light guiding body, and an inclined plane which is inclined to an optical axis of the light from the light source. A plurality of first reflecting units which make an input angle of the light from the light source with respect to the rear surface of the light guiding body gradually small are provided on a front face side, or the rear surface of the light guiding body. In addition, a plurality of second reflecting units which cause the light from the light source to be totally reflected to the front in an interface between the rear surface of the light guiding member and an air layer are provided on the rear surface of the light guiding member. In addition, the inclined plane is configured so that the input light is reflected in a direction which is close to an optical axis.

According to the configuration, the plurality of first reflecting units which make the input angle of the light from the light source with respect to the rear surface of the light guiding body gradually small are provided on the front side surface or the rear surface of the light guiding body, and the plurality of second reflecting units which cause the light from the light source to be totally reflected to the front in the interface between the rear surface of the light guiding member and the air layer are provided on the rear surface of the light guiding member. The light from the light source is guided while being repeatedly reflected between a portion on the front face side and the rear surface of the light guiding body, and the input angle of the light with respect to the rear surface of the light guiding body becomes gradually small. In addition, when the input angle of the light with respect to the rear surface of the light guiding body is smaller than a critical angle between the light guiding body and the low refractive index layer, the light from the light source is input to the low refractive index layer. For this reason, a flare angle of the light which is input to the low refractive index layer becomes small, and a flare angle of the light which is reflected on the interface between the rear surface of the light guiding member and the air layer also becomes small. In this manner, since the flare angle of the light which is emitted from the light guiding member can be made small, it is possible to improve a condensing property. In addition, it is also possible to improve luminance.

In addition, since it is possible to improve a condensing property and luminance without providing a plurality of optical sheets such as a condensing lens on the light guiding member, it is not necessary to provide the optical sheet. For this reason, it is possible to make the lighting system thin, and to reduce manufacturing cost by adopting a configuration of not providing the optical sheet. In addition, since there is no light loss when passing through the optical sheet by adopting the configuration of not providing the optical sheet, it is possible to improve the use efficiency of light.

In addition, the light from the light source is guided while being repeatedly reflected between the portion on the front face side and the rear surface of the light guiding body by providing the first reflecting unit on the front face side and the rear surface of the light guiding body, and the input angle of the light with respect to the rear surface of the light guiding body becomes small when being gradually separated from the light source. For this reason, the light from the light source is easily input to the low refractive index layer when being gradually separated from the light source. For this reason, it is possible to make light amount which is input to the low refractive index layer uniform in a portion which is close to the light source, and of which light amount (light flux) is large, and a portion which is far from the light source, and of which light amount (light flux) is small. As a result, it is possible to cause the light to be uniformly emitted from the light guiding member. In addition, it is also possible to make luminance uniform.

In addition, it is possible to cause the light to be uniformly reflected by the second reflecting unit by providing the plurality of second reflecting units which cause the light from the light source to be totally reflected to the front on the rear surface of the light guiding member. In this manner, it is possible to suppress occurring of irregular dots, and to make luminance more uniform. In addition, it is preferable that the second reflecting unit be provided approximately on the entire surface of the rear surface of the light guiding member, since it is possible to further uniformly emit the light from approximately the entire region of a light emitting region of the light guiding member.

Since the plurality of second reflecting units have a function of totally reflecting the light from the light source, the light which is input to the low refractive index layer from the light guiding body is emitted from the rear surface of the light guiding member, and accordingly, it is possible to suppress occurring of light loss. In addition, since the second reflecting unit causes the light to be totally reflected, absorption of the light in the second reflecting unit is suppressed. In this manner, it is possible to further improve use efficiency of the light.

Here, in the lighting system according to a first situation, as described above, in a case in which the light guiding member is configured by the light guiding body and the low refractive index layer, and the first and second reflecting units are provided, a V-shaped emission line easily occurs in the vicinity of an input unit (vicinity of light input unit) of the light guiding member. When such a V-shaped emission line occurs, there is a concern that quality of lighting in the vicinity of the input unit may be deteriorated.

Therefore, inventors of the present application have conducted extensive studies and found that the V-shaped emission line is caused by angular distribution of the input light, or the like, and it is possible to suppress the V-shaped emission line by providing an inclined plane which cause the input light to be reflected in a direction which is close to the optical axis in the light guiding member.

That is, the input light is reflected in the direction which is close to the optical axis due to an inclined plane, when providing the inclined plane which is inclined to the optical axis of the light from the light source in the light guiding member. In this manner, it is possible to cause the light with angular distribution which forms the V-shaped emission line to be changed to the light with angular distribution which does not form the V-shaped emission line. Accordingly, since it is possible to suppress occurring of the V-shaped emission line, occurring of uneven luminance which is caused by the V-shaped emission line can be suppressed in sheet-shaped light which is emitted from the lighting system. As a result, it is possible to obtain a lighting system of which luminance is highly uniform. In addition, since it is possible to effectively use the light which has formed the V-shaped emission line, it is possible to effectively improve use efficiency and luminance of light.

In addition, in the lighting system having the above described configuration, the light guiding member has an input plane to which the light from the light source is input, and it is preferable that the inclined plane be formed so as to extend in a direction which is inclined to the optical axis from the input plane. With such a configuration, it is possible to easily suppress occurring of uneven luminance, since occurring of the V-shaped emission line can be easily suppressed.

In addition, in the lighting system having the above described configuration, it is preferable to configure so that the inclined plane include a first inclined plane and a second inclined plane which are linearly symmetric to the optical axis. With such a configuration, it is possible to further improve uniformity of luminance, since occurring of the V-shaped emission line can be easily suppressed.

In addition, in the lighting system having the above described configuration, it is preferable that the light guiding member have a convex portion which protrudes onto the light source side, the convex portion be formed in a trapezoidal shape when viewed planarly, and an oblique side of the convex portion of the trapezoidal shape be the inclined plane. With such a configuration, it is possible to further easily suppress occurring of the V-shaped emission line, since the inclined plane can be easily formed in the light guiding member.

In addition, in the lighting system having the above described configuration, a notch portion is formed at an end portion of the light guiding member on the light source side, and it is also possible to form the inclined plane which causes the input light to be reflected in the direction which is close to the optical axis using the notch portion.

In addition, in the lighting system having the above described configuration, it is preferable that the width of the input plane to which the light from the light source is input be larger than that of a light emission unit of the light source. With such a configuration, it is possible to cause the light with the angular distribution which forms the V-shaped emission line to be effectively input to the inclined plane. In this manner, the light with the angular distribution which forms the V-shaped emission line is effectively reflected on the inclined plane, and it is possible to change the light to have angular distribution which does not form the V-shaped emission line.

In addition, in the lighting system having the above described configuration, the inclined plane may be subject to reflection processing on the outer surface side. With such a configuration, it is possible to increase reflection of light on the inclined plane. In addition, as an example of the reflection processing, for example, there is mirror processing, or the like.

In addition, in the lighting system having the above described configuration, it is preferable that an inclination angle of the inclined plane be set such that reflected light is parallel to the optical axis. With such a configuration, it is possible to suppress occurring of the V-shaped emission line, and to further effectively improve uniformity of luminance.

In addition, in the lighting system having the above described configuration, the front face and rear surface of the light guiding body can be formed so as to be approximately parallel to each other.

In addition, a display device according to the present invention includes a lighting system having each configuration which is described above, a display panel which receives light from the lighting system. With such a configuration, it is possible to obtain a thin display device with high luminance in which uneven luminance is suppressed at low cost.

Advantageous Effects of Invention

As described above, according to the present invention, it is possible to easily obtain a lighting system and a display device which are capable of improving use efficiency of light and luminance thereof while suppressing uneven luminance.

In addition, according to the present invention, it is possible to easily obtain a lighting system and a display device which can be made thin, and can be made at low cost.

DESCRIPTION OF EMBODIMENTS

Hereinafter, embodiments of the present invention will be described based on drawings.

First Embodiment

Figure 1:
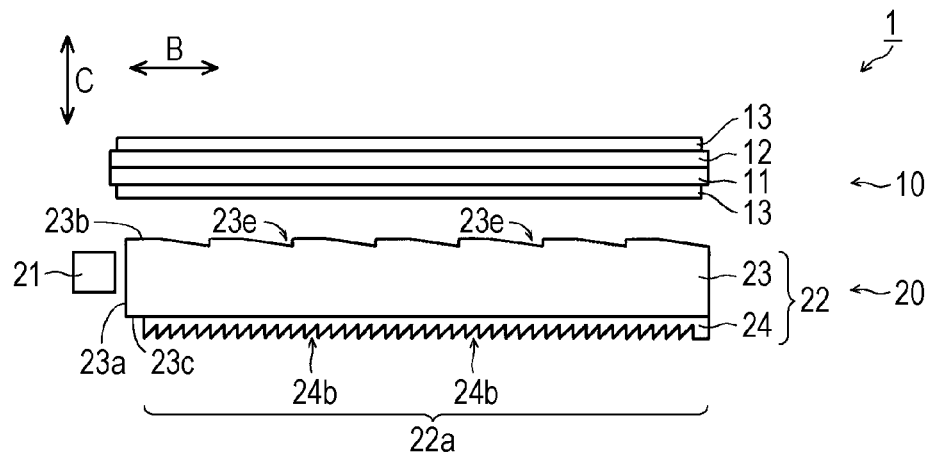
FIG. 1 is a side view of a liquid crystal display device including a backlight unit according to a first embodiment of the present invention.
Figure 2:
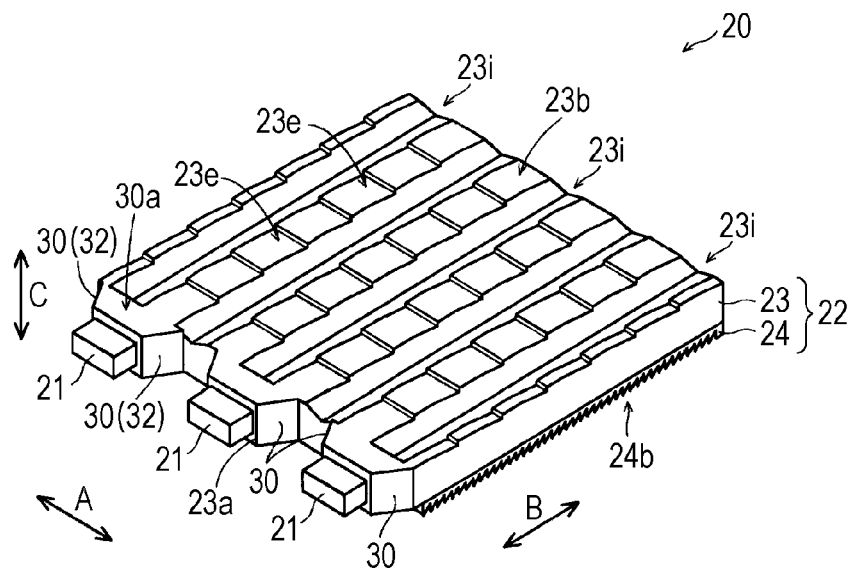
FIG. 2 is a perspective view which schematically illustrates the backlight unit according to the first embodiment of the present invention.
Figure 3:
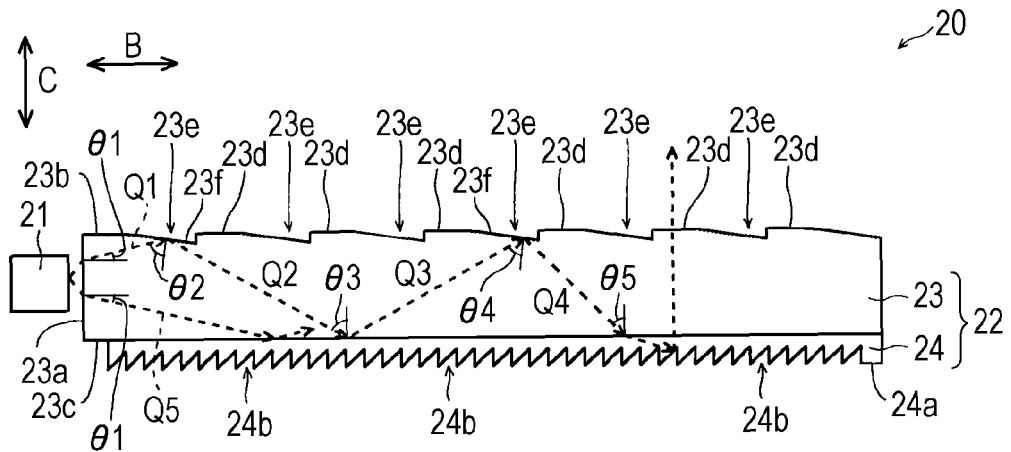
FIG. 3 is a cross-sectional view which schematically illustrates the backlight unit according to the first embodiment of the present invention, and also is a diagram of an optical path which illustrates an optical path of light.

FIG. 1 is a side view of a liquid crystal display device which includes a backlight unit according to a first embodiment of the present invention. FIG. 2 is a perspective view which schematically illustrates the backlight unit according to the first embodiment of the present invention. FIG. 3 is a side view which schematically illustrates the backlight unit according to the first embodiment of the present invention. FIGS. 4 to 20 are drawings for describing the backlight unit according to the first embodiment of the present invention. First, the backlight unit according to the first embodiment of the present invention, and the liquid crystal display device which includes the backlight unit will be described with reference to FIGS. 1 to 20.

As illustrated in FIG. 1, a liquid crystal display device 1 according to the first embodiment includes a liquid crystal display panel 10, a backlight unit 20 which is arranged on the rear surface side of the liquid crystal display panel 10, and a frame (not shown) which accommodates the liquid crystal display panel 10 and the backlight unit 20. In addition, the liquid crystal display device 1 is an example of a "display device" of the present invention, the liquid crystal display panel 10 is an example of a "display panel" of the present invention. In addition, the backlight unit 20 is an example of a "lighting system" of the present invention.

The liquid crystal display panel 10 is configured by bonding an active matrix substrate 11 which includes a switching element, for example, a Thin Film Transistor (TFT), or the like, and an opposing substrate 12 which faces the active matrix substrate 11 using a sealing material (not shown). In addition, liquid crystal (not shown) is injected into a gap between both the substrates 11 and 12. In addition, polarizing films 13 are attached onto the light receiving surface side of the active matrix substrate 11, and the emission surface side of the opposing substrate 12, respectively.

The liquid crystal display panel 10 which is configured in this manner displays an image using a change in transmittivity which is caused by inclination of liquid crystal molecules.

The backlight unit 20 according to the first embodiment is an edge light-type backlight unit. As illustrated in FIGS. 1 and 2, the backlight unit 20 includes an LED 21 as a light source, and a light guiding plate 22 which guides light from the LED 21. In addition, the backlight unit 20 includes the plurality of LEDs 21, and in which the plurality of LEDs 21 are arranged so as to align in A direction (for example, width direction of light guiding plate 22: refer to FIG. 2). In addition, the light guiding plate 22 is an example of a "light guiding member" of the present invention.

According to the first embodiment, as illustrated in FIG. 1, an optical sheet such as a condensing lens is not provided between the light guiding plate 22 of the backlight unit 20 and the liquid crystal display panel 10.

The light guiding plate 22 is formed by a plate shaped member of one plate. In addition, the light guiding plate 22 is configured by a light guiding body 23 which includes a light input plane 23a to which light from the LED 21 is input, and a low refractive index layer 24 in which refractivity is smaller than that of the light guiding body 23.

It is preferable that refractivity of the light guiding body 23 (n1) be equal to or greater than 1.42, and is more preferable when being 1.59 to 1.65. On the other hand, it is preferable that the refractivity of the low refractive index layer 24 (n2) be less than 1.42, and is more preferable when being 1.10 to 1.35. In addition, it is preferable that a relationship of n1/n2>1.18 be established between the refractivity of the light guiding body 23 (n1) and the refractivity of the low refractive index layer 24 (n2).

The light guiding body 23 which configures the light guiding plate 22 is formed of a transparent resin material, for example, acryl, polycarbonate, or the like. When the light guiding body 23 is configured of acryl, or the like, it is possible to make the refractivity of the light guiding body 23 be approximately 1.49. In addition, when the light guiding body 23 is configured of polycarbonate, or the like, it is possible to make the refractivity of the light guiding body 23 be approximately 1.59. In addition, when the light guiding body 23 is configured of acryl, it is possible to improve translucency thereof compared to a case in which the light guiding body 23 is configured of polycarbonate.

In addition, the light guiding body 23 is formed in an approximately rectangular body shape. That is, the light guiding body 23 is formed so that the light emission plane 23b and the rear surface 23c are approximately parallel. In addition, the light input plane (input plane) 23a of the light guiding body 23 is arranged so as to be approximately parallel to the light emission plane of the LED 21.

As illustrated in FIG. 3, the low refractive index layer 24 is integrally formed on the rear surface 23c of the light guiding body 23 without an air layer, or the like. The thickness of the low refractive index layer 24 is, for example, approximately 10 μm to 50 μm.

In addition, the low refractive index layer 24 is configured of a transparent resin material with refractivity which is lower than that of the light guiding body 23. As such a resin material, for example, there is a resin, or the like, which contains fluorine-based acrylate, empty particles such as nanosized inorganic filler, or the like. When the low refractive index layer 24 is configured of fluorine-based acrylate, or the like, it is possible to make the refractivity of the low refractive index layer 24 be approximately 1.35. In addition, when the low refractive index layer 24 is configured of the resin, or the like, which contains empty particles such as the nanosized inorganic filler or the like, it is possible to make the refractivity of the low refractive index layer 24 be equal to or less than 1.30.

In addition, in the first embodiment, as illustrated in FIG. 3, a plurality of prisms 23e which make an input angle of light from the LED 21 with respect to the rear surface 23c of the light guiding body 23 gradually small are formed on the light emission plane 23b of the light guiding body 23. Specifically, the plurality of planar portions 23d and the plurality of concaved prisms 23e are alternately formed along the normal direction (B direction (direction orthogonal to A direction) of the light input plane 23a of the light guiding body 23 on the light emission plane 23b of the light guiding body 23. That is, the planar portion 23d is formed between the prisms 23e which are neighboring in the B direction (for example, longitudinal direction of light guiding plate 22). These planar portion 23d and the prism 23e are formed so as to extend in the A direction, respectively (refer to FIG. 2). In addition, the prism 23e is an example of a "first reflecting unit" of the present invention.

Figure 4:
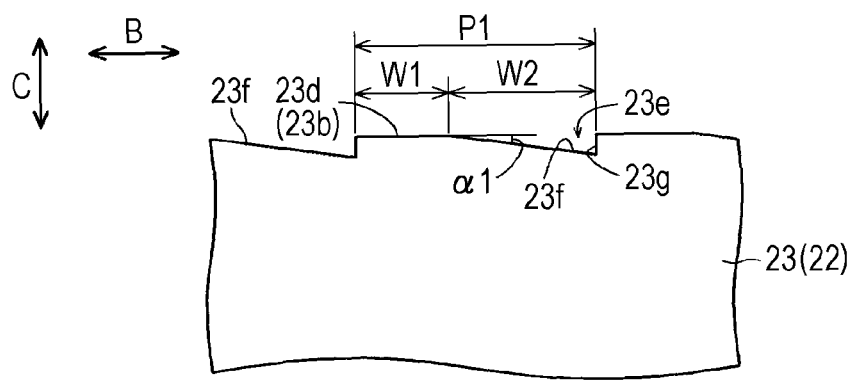
FIG. 4 is an enlarged cross-sectional view which illustrates a structure of an optical emission plane of a light guiding body of the backlight unit according to the first embodiment of the present invention.

In addition, the planar portions 23d are formed on the same plane as the light emission plane 23b, and are formed approximately in parallel to the rear surface 23c. As illustrated in FIG. 4, the planar portions 23d are formed so as to have a predetermined width W1 in the B direction.

The concaved prism 23e is formed by an inclined plane 23f which is inclined to the planar portion 23d (light emission plane 23b), and a vertical plane 23g which is approximately vertical to the planar portion 23d (light emission plane 23b). As illustrated in FIG. 3, the inclined plane 23f is formed so as to be close to the rear surface 23c when being gradually separated from the LED 21. In this manner, as will be described later, an input angle of the light which is emitted from the LED 21 with respect to the rear surface 23c of the light guiding body 23 becomes gradually small by repeating reflection between the inclined plane 23f (prism 23e) and the rear surface 23c of the light guiding body 23. In addition, as illustrated in FIG. 4, it is preferable that an inclination angle $\alpha 1$ of the inclined plane 23f with respect to the planar portion 23d be equal to or less than 5°, and more preferable when the angle is 0.1° to 3.0°.

The inclined plane 23f (prism 23e) is formed so as to have a predetermined width W2 in the B direction. It is preferable that the width W2 of the inclined plane 23f (prism 23e) in the B direction be equal to or less than 0.25 mm, and more preferable when the width is 0.01 mm to 0.10 mm. In addition, the inclined plane 23f (prism 23e) is arranged at a predetermined pitch P1 (=W1+W2) in the B direction.

In addition, the width W1 of the planar portion 23d in the B direction, the inclination angle $\alpha 1$ of the inclined plane 23f, the width W2 of the inclined plane 23f (prism 23e) in the B direction, and the pitch P1 of the inclined plane 23f (prism 23e) in the B direction may be constant regardless of a distance from the LED 21.

Figure 5:
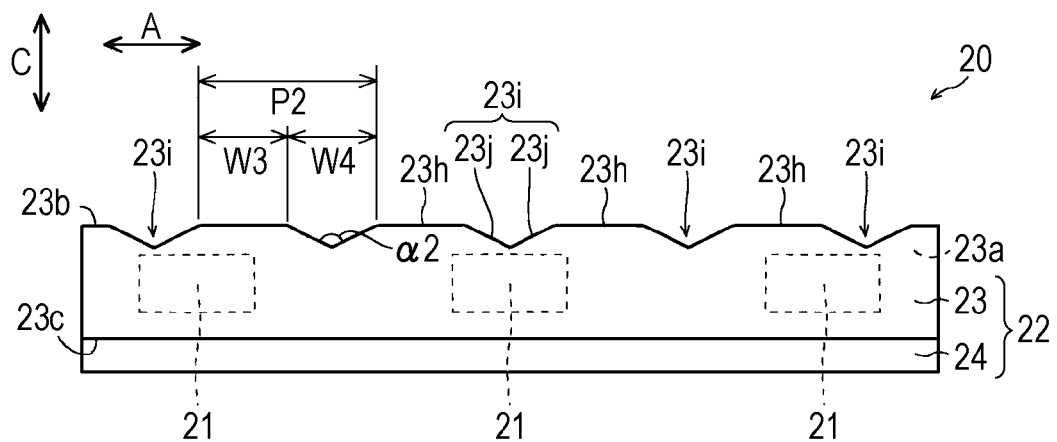
FIG. 5 is a cross-sectional view which schematically illustrates the backlight unit according to the first embodiment of the present invention.

In addition, as illustrated in FIG. 5, according to the first embodiment, a plurality of planar portions 23h and a plurality of concaved prisms 23i are alternately formed on the light emission plane 23b of the light guiding body 23 along the A direction. That is, the planar portion 23h is formed between the prisms 23i which are neighboring along the A direction. These planar portion 23h and the prism 23i are formed, respectively, so as to extend in the normal direction (B direction) of the light input plane 23a of the light guiding body 23.

In addition, the planar portion 23h is formed on the same plane as the light emission plane 23b. In addition, the planar portions 23h are formed so as to have a predetermined width W3 in the A direction.

The concaved prism 23i is formed by a pair of inclined planes 23j which is inclined to the planar portion 23h (light emission plane 23b). That is, the concaved prism 23i is formed so as to have a triangular shape in a cross section thereof. It is preferable that an angle which is formed by the pair of inclined planes 23j (vertical angle of prism 23i) $\alpha 2$ be approximately 120° to 140°.

In addition, the pair of inclined planes 23j (prism 23i) is formed so as to have a predetermined width W4 in the A direction. It is preferable that the width W4 of the pair of inclined planes 23j (prism 23i) in A direction be approximately equal to or less than 0.1 mm, and more preferable when the width is approximately 0.010 mm to 0.030 mm.

It is preferable that the pitch P2 (=W3+W4) of the prism 23i in the A direction be P2≤W4×2. That is, it is preferable that the width W3 of the planar portion 23h in the A direction be a dimension which is equal to or less than the width W4 of the pair of inclined planes 23j in the A direction.

In addition, it is preferable that the prism 23i be formed in the same shape, in the same size, and at the same pitch regardless of a formation position on the plane of the light guiding body 23. That is, it is preferable that the width W3 of the planar portion 23h in the A direction, the angle $\alpha 2$ which is formed by the pair of inclined planes 23j (vertical angle of prism 23i), the width W4 of the pair of inclined planes 23j (prism 23i) in the A direction, and the pitch P2 of the pair of inclined planes 23j (prism 23i) in the A direction be constantly formed, respectively.

In this manner, according to the first embodiment, the prism 23i is formed on the same plane as that of the prism 23e so as to be overlapped with the prism 23e. The prism 23i has a function of diffusing light in the horizontal direction (A direction). In addition, it is preferable that an occupation area ratio of the prism 23i to the prism 23e be 50% or more.

A plurality of concaved prisms 24b are formed on the rear surface 24a (rear surface of light guiding plate 22) of the low refractive index layer 24. The prisms 24b are formed at least in the entire region of a light emission region 22a of the light guiding plate 22 (refer to FIG. 1). In addition, the prisms 24b are formed so as to extend in the A direction (refer to FIG. 2). In addition, the light emission region 22a of the light guiding plate 22 is arranged so as to correspond to a display area of the liquid crystal display panel 10. In addition, the prism 24b is an example of a "second reflecting unit" of the present invention.

Figure 6:
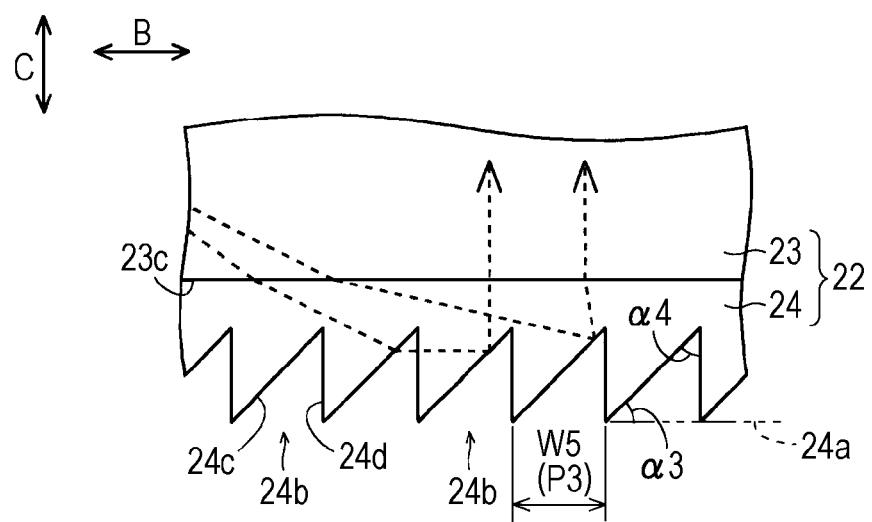
FIG. 6 is an enlarged cross-sectional view which illustrates a structure on the rear surface side of a light guiding plate of the backlight unit according to the first embodiment of the present invention.

In addition, as illustrated in FIG. 6, the concaved prism 24b is formed by an inclined plane 24c which is inclined to the rear surface 24a, and a vertical plane 24d which is vertical to the rear surface 24a.

In addition, according to the first embodiment, the inclined plane 24c is formed as a flat surface which is not curved. The inclined plane 24c is formed so as to be close to the light guiding body 23 when being gradually separated from the LED 21. In this case, it is preferable that an inclination angle $\alpha 3$ with respect to the rear surface 24a of the inclined plane 24c be approximately 40° to 50°. That is, it is preferable that the angle which is formed by the inclined plane 24c and the vertical plane 24d be approximately 50° to 40°.

In addition, the inclined plane 24c (prism 24b) is formed so as to have a predetermined width W5 in the B direction. The width W5 of the inclined plane 24c (prism 24b) in the B direction is approximately equal to or less than 0.1 mm, and it is preferable when the width is approximately 0.010 mm to 0.025 mm.

In addition, the inclined plane 24c (prism 24b) is arranged at a pitch P3 which is the same dimension as that of the width W5 in the B direction. That is, the plurality of prisms 24b are consecutively formed without a gap in the B direction, and a planar portion is not provided between the prisms 24b.

In addition, the prism 24b may be formed in the same shape, in the same size, and at the same pitch on the entire surface of the rear surface 24a of the low refractive index layer 24 regardless of a formation position on the plane of the low refractive index layer 24. In this manner, when the prism 24b is formed in the same shape, in the same size, and at the same pitch, it is possible to suppress a difference in a condensing property of light on the plane of the low refractive index layer 24. Due to this, it is possible to make luminance of the liquid crystal display panel 10 uniform.

As will be described later, the prism 24b has a function of totally reflecting light from the LED 21 to the front on the interface between the light guiding plate 22 and an air layer.

Here, as described above, when the light guiding plate 22 is configured by the light guiding body 23 and the low refractive index layer 24, and is provided with the prisms 23e, 23i, 24b, and the like, as will be described later, the V-shaped emission line easily occurs in the vicinity (vicinity of light input unit) of the light input plane 23a of the light guiding plate 22. When such a V-shaped emission line occurs, there is a concern that quality of lighting in the vicinity of the light input plane 23a may be deteriorated.

Figure 7:
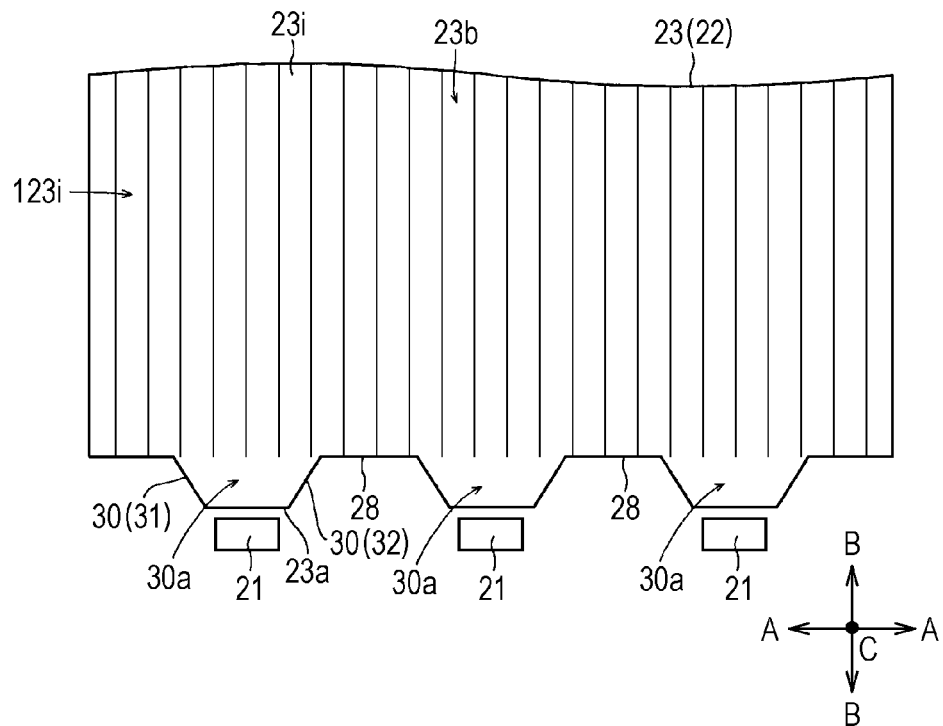
FIG. 7 is a plan view which schematically illustrates a part of the backlight unit according to the first embodiment of the present invention.

For this reason, according to the first embodiment, as illustrated in FIGS. 2 and 7, a pair of inclined planes 30 (31 and 32) which are inclined to an optical axis O (refer to FIG. 8) of light from the LED 21 at a predetermined angle are formed at an end portion of the light guiding plate 22 on the LED 21 side. In addition, the inclined planes 31 and 32 are examples of the "first inclined plane" and the "second inclined plane" of the present invention, respectively.

Figure 8:
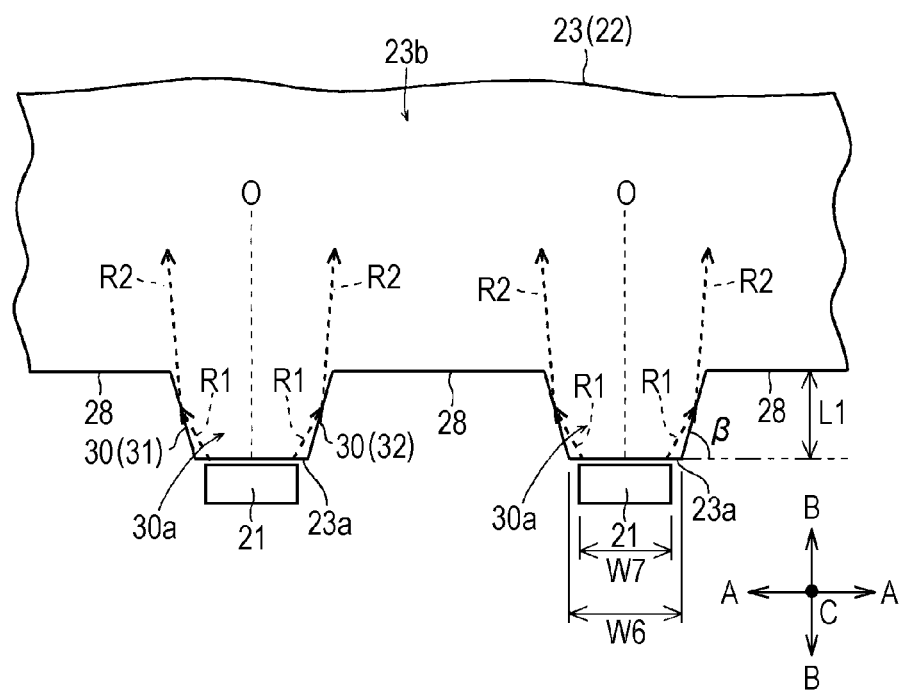
FIG. 8 is a plan view which illustrates FIG. 7 by enlarging a part thereof, and also is a diagram of an optical path which illustrates an optical path of light.

Specifically, a convex portion 30a which protrudes onto the LED 21 side is integrally formed with the light guiding plate 22 at an end portion of the light guiding plate 22 on the LED 21 side. The convex portion 30a is formed in a trapezoidal shape when viewed planarly, and oblique sides of the trapezoidal shape become the inclined plane 30. That is, a trapezoidal prism 30a including the inclined plane 30 is formed at the end portion of the light guiding plate 22. In addition, as illustrated in FIG. 8, the pair of inclined planes 30 (oblique sides) is linearly symmetric to the optical axis O. In addition, the inclined planes 30 are formed to be approximately vertical to the light emission plane 23b, or the rear surface 23c of the light guiding body 23. In addition, the inclined planes 30 are formed so as to extend in a direction which is inclined to the optical axis O from the light input plane 23a.

In addition, according to the first embodiment, the light input plane 23a of the light guiding plate 22 is provided in the trapezoidal convex portion 30a, and light which is input from the light input plane 23a is reflected on the inclined plane 30. In addition, the inclined plane 30 is formed so that light R2 which is input to the light guiding plate 22 from the LED 21 is reflected in a direction which becomes close to the optical axis O (direction in which angle between light and optical axis O becomes small). That is, the inclined plane 30 reflects the light R2 which is emitted to a direction of the V-shaped emission line, and changes angular distribution of the light in the horizontal direction (transverse direction).

In addition, it is preferable that the width W6 of the light input plane 23a in the A direction be configured so as to be larger than the W7 of the LED 21. With such a configuration, it is possible to cause light from the LED 21 to be effectively input into the light guiding plate 22 from the light input plane 23a. In addition, it is possible to obtain the same effect as the above effect when the width W6 of the light input plane 23a is larger than that of the light emission unit of the LED 21. In addition, it is preferable that a protrusion amount of the convex portion 30a (distance L1 from light input plane 23a to end surface 28) be set to the length in which almost all of the light R1 which is emitted in the V-shaped emission line direction is input to the inclined plane 30. Specifically, it is possible to set the distance L1, for example, to approximately 2 mm to 3.5 mm (for example, approximately 3 mm). In addition, it is preferable that the angle β of the inclined plane 30 with respect to the light input plane 23a be set to an angle in which almost all of the light R1 emitted in the V-shaped emission line direction is input to the inclined plane 30. In this case, it is more preferable when the angle is an angle in which the light R1 emitted in the V-shaped emission line direction is reflected so as to be parallel to the optical axis O.

For example, when the refractivity of the light guiding body 23 (n1) is 1.59, and the refractivity of the low refractive index layer 24 (n2) is 1.3, the V-shaped emission line appears in a direction of approximately 39° with respect to the optical axis O. At this time, when the width W7 of the LED 21 is approximately 2.2 mm, and the width W6 of the light input plane 23a is approximately 3 mm, and when the distance L1 from the light input plane 23a to the end surface 28 is set to approximately 3 mm, and the angle β of the inclined plane 30 with respect to the light input plane 23a is set to approximately 80°, almost all of the light beams R1 which are emitted in the V-shaped emission line direction among the light beams which are input to the light guiding plate 22 from a center of the light input plane 23a are input to the inclined plane 30.

In addition, according to the first embodiment, as illustrated in FIG. 7, a formation region 123i of the prism 23i is set to the trapezoidal prism 30a (inclined plane 30) (to end surface 28).

Subsequently, an optical path of light which is emitted from the LED 21 of the backlight unit 20 according to the first embodiment will be described with reference to FIGS. 3, 5, 6, and 8.

The light which is emitted from the LED 21 has the highest intensity in the front direction (B direction) of the LED 21, and is diffused at an angle of ±90° in the A direction, and the C direction with respect to the front direction (B direction). As illustrated in FIG. 3, the light which is emitted from the LED 21 is refracted when being input to the light input plane 23a of the light guiding body 23 (light guiding plate 22), and of which diffusion in the A direction and C direction with respect to the front direction (B direction) becomes ±θ1. In addition, the angle θ1 is a critical angle between the light guiding body 23 and the air layer, and the θ1 is equal to arcsin (1/n1).

Light Q1 in the light which is input to the light input plane 23a of the light guiding body 23 which proceeds to the light emission plane 23b of the light guiding body 23 proceeds to the inclined plane 23f of the prism 23e with an input angle which is equal to or greater than θ2(=90°−θ1−α1), and almost all thereof is totally reflected on the rear surface 23c side in the prism 23e (interface between light emission plane 23b of light guiding body 23 and air layer) of the light guiding body 23.

In addition, the light Q2 which is totally reflected on the prism 23e proceeds to the rear surface 23c (low refractive index layer 24) with an input angle which is equal to or greater than θ3 (=90°−θ1−α1×2). At this time, only light with an input angle which is smaller than the critical angle between the light guiding body 23 and the low refractive index layer 24 among light beams Q2 which proceed to the rear surface 23c is input to the low refractive index layer 24. On the other hand, light with an input angle which is equal to or greater than the critical angle between the light guiding body 23 and the low refractive index layer 24 among the light beams Q2 which proceed to the rear surface 23c is totally reflected on the light emission plane 23b side in the rear surface 23c (interface between light guiding body 23 and low refractive index layer 24) of the light guiding body 23.

In addition, the light Q3 which is totally reflected on the rear surface 23c proceeds to the inclined plane 23f of the prism 23e at an input angle which is equal to or greater than θ4 (=90°−θ1−α1×3), and is totally reflected on the rear surface 23c side of the prism 23e of the light guiding body 23.

In addition, light Q4 which is totally reflected in the prism 23e proceeds to the rear surface 23c (low refractive index layer 24) at an input angle which is equal to or greater than θ5 (=90°−θ1−α1×4) or more. At this time, only light of which the input angle is smaller than the critical angle between the light guiding body 23 and the low refractive index layer 24 among the light beams Q4 which proceed to the rear surface 23c is input to the low refractive index layer 24. On the other hand, light of which the input angle is equal to or greater than the critical angle between the light guiding body 23 and the low refractive index layer 24 among the light beams Q4 which proceed to the rear surface 23c is totally reflected on the rear surface 23c of the light guiding body 23 to the light emission plane 23b side.

In this manner, the light which is emitted from the LED 21 is guided so that the input angle with respect to the rear surface 23c of the light guiding body 23 becomes gradually small by being repeatedly reflected between the prism 23e of the light guiding body 23 (light emission plane 23b) and the rear surface 23c, and is input to the low refractive index layer 24.

In addition, when the light which is emitted from the LED 21 is repeatedly reflected between the prism 23e of the light guiding body 23 and the rear surface 23c, the input angle with respect to the rear surface 23c of the light guiding body 23 becomes small by approximately α1×2. For this reason, a flare angle of the light which is input to the low refractive index layer 24 in the B direction becomes approximately equal to or less than α1×2.

In addition, among the light beams which are input to the light input plane 23a of the light guiding body 23, the light Q5 which proceeds to the rear surface 23c of the light guiding body 23 is input to the low refractive index layer 24 by being repeatedly reflected between the rear surface 23c of the light guiding body 23 and the prism 23e (light emission plane 23b).

Thereafter, as illustrated in FIG. 6, almost all of the light beams which are input to the low refractive index layer 24 are totally reflected (refer to dashed arrow) on the inclined plane 24c of the prism 24b (interface between inclined plane 24c of prism 24b and air layer) to the front (liquid crystal display panel 10 side), or is totally reflected after penetrating (refer to dashed arrow). In addition, the totally reflected light (refer to dashed arrow) is input to the light guiding body 23 again, and is emitted to the front (liquid crystal display panel 10 side) from the light emission plane 23b (refer to FIG. 3).

In addition, since the refractivity of the light guiding body 23 (n1) is equal to or greater than 1.42 (approximately 1.59 to 1.65), and refractivity of the air layer is approximately 1, the critical angle between the light guiding body 23 and the air layer is smaller than that between the light guiding body 23 and the low refractive index layer 24. For this reason, there is little light which is emitted from the light emission plane 23b without passing through the prism 24b of the low refractive index layer 24.

First, according to the first embodiment, since the prism 23i is formed on the front face 23b of the light guiding body 23 as illustrated in FIG. 5, a part of light beams which proceed to the front face 23b of the light guiding body 23 is diffused (reflected) to both sides in the A direction on the inclined plane 23j of the prism 23i.

At this time, light of which an input angle with respect to the front face 23b of the light guiding body 23 is large when viewed from the light input plane 23a side of the light guiding body 23 has an input angle which is small with respect to the rear surface 23c of the light guiding body 23 by being reflected on the inclined plane 23j of the prism 23i.

In addition, the light from the LED 21 is input to the low refractive index layer 24, as described above, while being diffused in the A direction.

On the other hand, as illustrated in FIG. 8, among the light beams from the LED 21 which are input from the light input plane 23a, the light R1 which is emitted in the V-shaped emission line is reflected in the direction which is close to the optical axis O (direction in which the angle between light and optical axis O becomes small) by the inclined plane 30. Due to this, the light R1 with angular distribution which forms the V-shaped emission line is changed into the light R2 with angular distribution which does not form the V-shaped emission line. Accordingly, it is possible to suppress occurring of the V-shaped emission line.

Subsequently, the reason why the light which is emitted from the light guiding plate 22 is prevented from being diffused in the A direction will be described in detail with reference to FIGS. 15 to 20.

Figure 15:
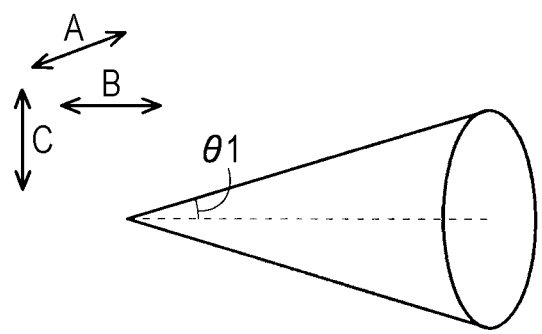
FIG. 15 is a perspective view for describing spreading of light which is input to the light guiding body of the backlight unit according to the first embodiment of the present invention.

The light which is emitted from the LED 21 has a flare angle of ±90° in the A and C directions with respect to the front direction (B direction) of the LED 21. The light which is emitted from the LED 21 is refracted when being input to the light input plane 23a of the light guiding body 23, and as illustrated in FIG. 15, a flare angle in the A and C directions with respect to the B direction becomes ±θ1. In addition, the angle θ1 is a critical angle between the light guiding body 23 and the air layer.

Here, when it is assumed that light is present in a range of an angle θ in the A and C directions with respect to the B direction in the light guiding body 23, the following expression (1) is established.

$$\theta \leq \theta 1 = \arcsin(1/n1) \quad (1)$$

When the critical angle between the light guiding body 23 and the low refractive index layer 24 is set to φ, there is a possibility that only light in a region which satisfies the following expression (2) is input to the low refractive index layer 24.

$$\pi/2 - \theta < \phi = \arcsin(n2/n1) \quad (2)$$

Figure 16:
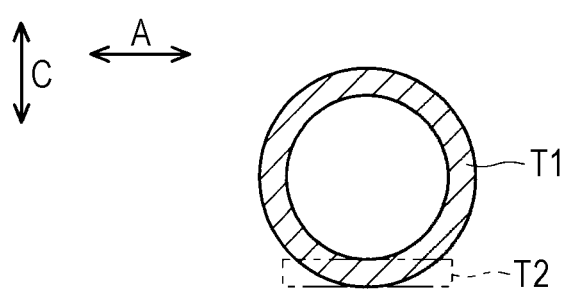
FIG. 16 is a diagram in which light input to the light guiding body of the backlight unit according to the first embodiment of the present invention is viewed from the LED side.
Figure 17:
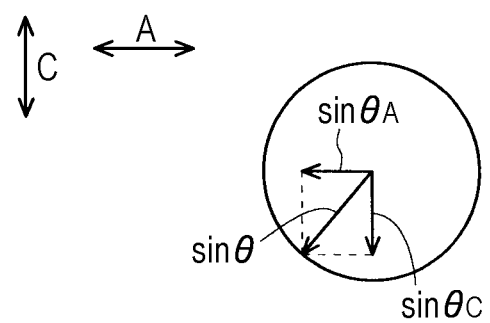
FIG. 17 is a diagram in which, among light beams input to the light guiding body of the backlight unit according to the first embodiment of the present invention, light which is input to a low refractive index layer is viewed from the LED side.

In addition, when illustrating the region, it becomes the region T1 (hatched region) in FIG. 16. In addition, as will be described later, among light beams which are input to the light guiding body 23, only light in the region T2 in FIG. 16 can be input to the low refractive index layer 24 in practice, right after being input thereto. The reason will be described later.

When a diffusing component of the light which is input to the light guiding body 23 in the C direction is set to $f_C$, an input angle of light to the low refractive index layer 24 becomes $\pi/2 - \theta_C$. In addition, since conditions of light to be input to the low refractive index layer 24 are $\pi/2 - \theta_C < \phi$ and $0 < \pi/2 - \theta_C < 90$, it is possible to obtain the following expression (3). In addition, when a diffusing component of the light which is input to the light guiding body 23 in the A direction is set to $\theta_A$, the $\theta_A$ satisfies the following expression (4) from FIG. 17.

$$\cos(\pi/2-\theta_C)=\sin\theta_C>\cos\phi \quad (3)$$

$$\sin^2\theta_A=\sin^2\theta-\sin^2\theta_C \quad (4)$$

Here, since $\sin\theta\leq\sin\theta1$ and $\cos\phi<\sin\theta_C\leq\sin\theta1$ are obtained from the expressions (1) and (3), it is possible to obtain the following expression (5) using the expression (4).

$$0\leq\sin^2\theta_A<\sin^2\theta1-\cos^2\phi \quad (5)$$

For example, when n1=1.59, and n2=1.35, a range in which $\theta_A$ is obtained is $0\leq\theta_A<19.95$, and it is possible to suppress diffusion of light in the A direction. In addition, the effect of suppressing the diffusion of light in the A direction is slightly weakened by the prism 23i, however, it is possible to maintain most of the effect of suppressing the diffusion of light in the A direction by making an inclination angle of the prism 23i (make vertical angle small) large, since the dimension of the width W3 of the planar portion 23h in the A direction is equal to or less than the width W4 of the prism 23i in the A direction.

Figure 18:
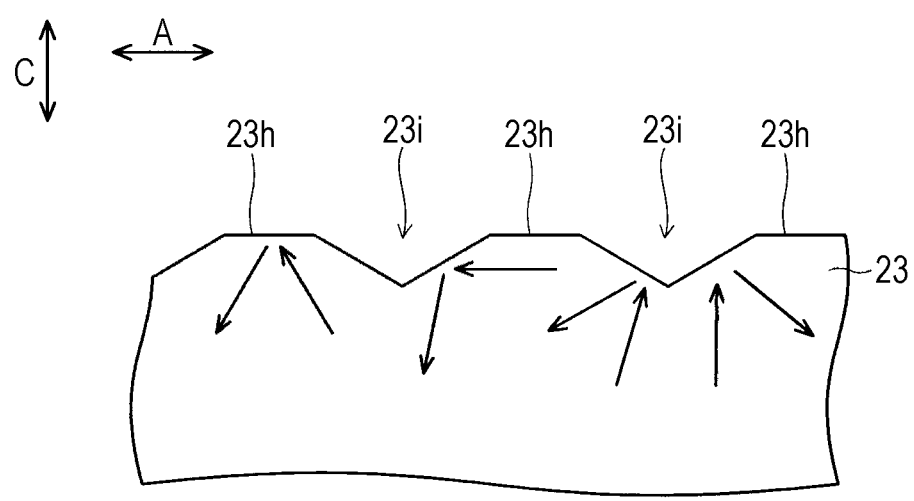
FIG. 18 is a diagram which illustrates light reflected on a planar portion 23h and a prism 23i of the light guiding body of the backlight unit according to the first embodiment of the present invention.
Figure 19:
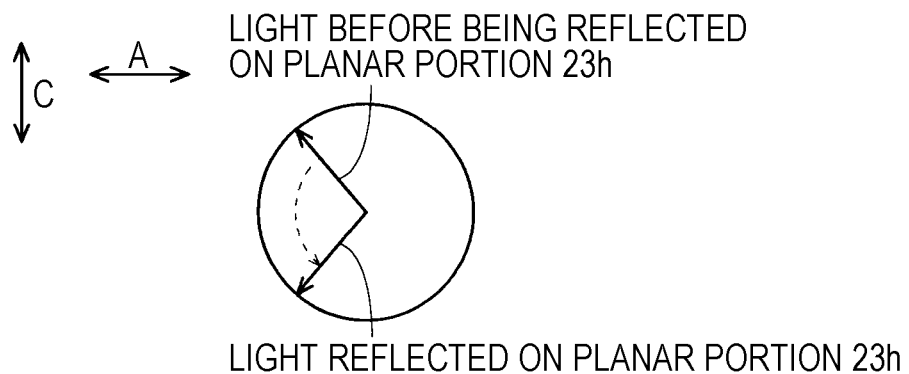
FIG. 19 is a diagram which illustrates light reflected on the planar portion 23h of the light guiding body of the backlight unit according to the first embodiment of the present invention.
Figure 20:
FIG. 20 is a diagram which illustrates light reflected on the prism 23i of the light guiding body of the backlight unit according to the first embodiment of the present invention.

Influences of the planar portion 23h and the prism 23i will be further described. As illustrated in FIGS. 18 and 19, a direction of light which is reflected on the planar portion 23h of the light guiding body 23 is reversed in the C direction while maintaining diffusion in the B and A directions. On the other hand, as illustrated in FIGS. 18 and 20, a diffusing component of the light which is reflected on the prism 23i of the light guiding body 23 in the C and A directions is changed while maintaining diffusion in the B direction.

For this reason, it is possible to prevent diffusion of light in the C and A directions in the light guiding body 23 from being biased. That is, since diffusion of light in the C and A directions is frequently changed in the light guiding body 23 due to the prism 23i, it is possible to cause components in the C and A directions to have an equal value.

In this manner, the light in the region T1 which satisfies the expression (2) is input to the low refractive index layer 24 by satisfying the expression (3) when diffusing components in the C and A directions are changed by the prism 23i. As a result, it is possible to cause light of which diffusion in the A direction is prevented to be uniformly emitted from the light guiding plate 22.

Subsequently, the V-shaped emission line which occurs in the vicinity of the light input plane of the light guiding plate 22 will be described with reference to FIGS. 2, 3, 5, and 8 to 14.

Figure 9:
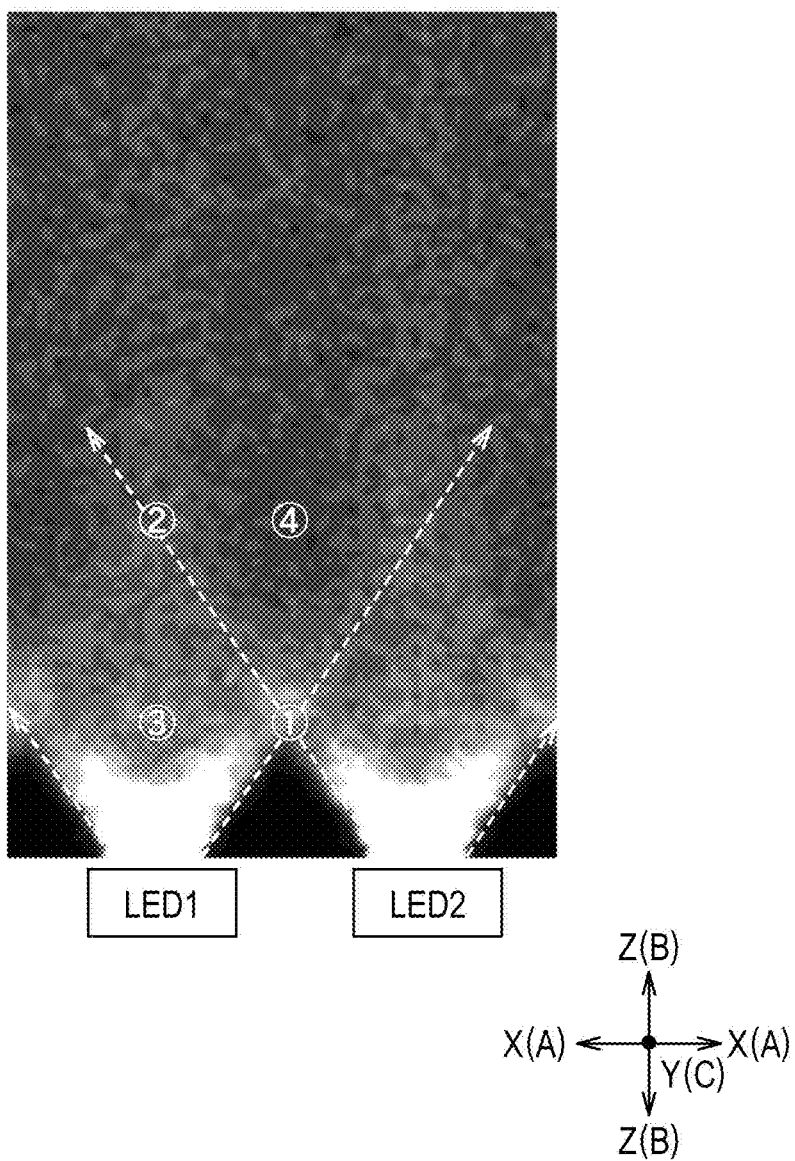
FIG. 9 is a diagram which illustrates a V-shaped emission line.

As described above, when the light guiding plate 22 (refer to FIG. 2) is configured by the light guiding body 23 and the low refractive index layer 24, and is provided with the prisms 23e, 23i, 24b, and the like, as illustrated in FIG. 9, the V-shaped emission line (refer to dashed line) easily occurs in the vicinity of the light input plane of the light guiding plate 22. For this reason, inventors of the application have performed various examinations regarding causes of occurring of the V-shaped emission line.

Figure 10:
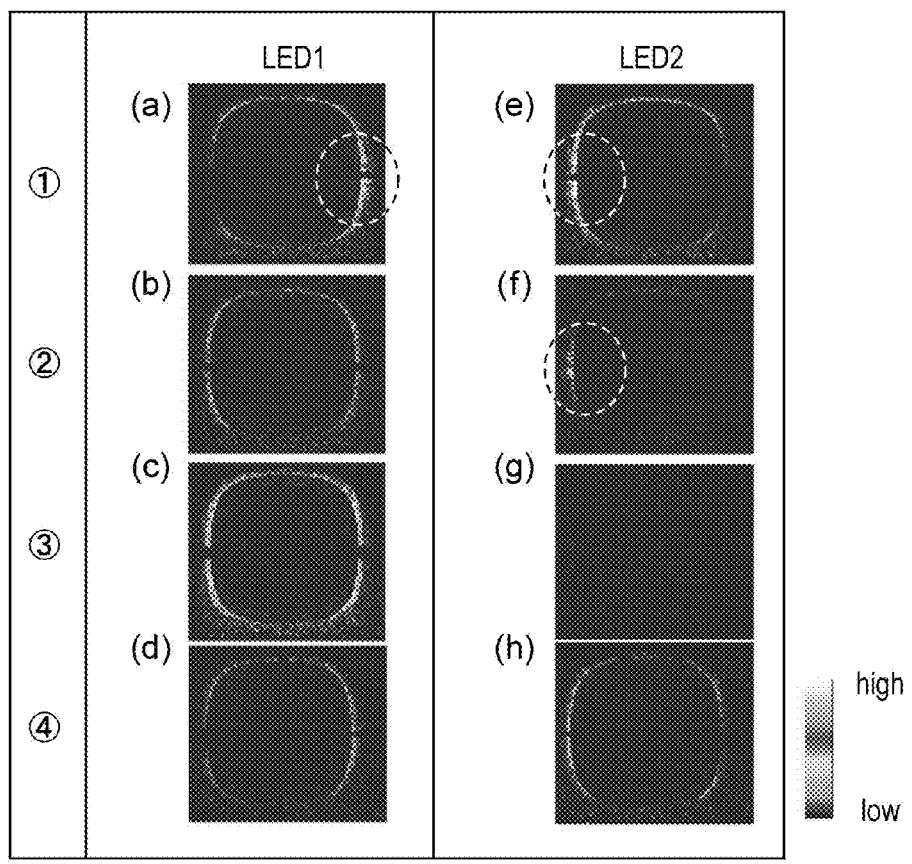
FIG. 10 is a diagram which illustrates angular distribution of light in each region in FIG. 9.
Figure 10:
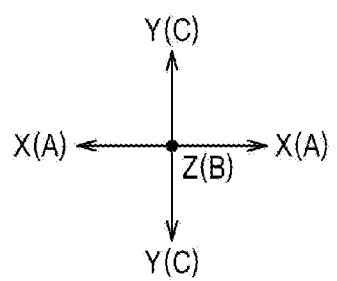

First, light in what angle in all angle distribution of light emitted from the LED (light source) influences the V-shaped emission line is obtained using a simulation. The result is illustrated in FIG. 10. FIG. 10 is a diagram which illustrates angular distribution of light in each region in FIG. 9. The region "1" is located at respective portions of the V-shaped emission lines of LEDs 1 and 2, and the region "2" is located at the portion of the V-shaped emission line of the LED 2. On the other hand, the regions "3" and "4" are located at regions which are separated from the V-shaped emission line. In addition, FIGS. 10(a) to 10(d) illustrate angular distribution of light from the LED 1, and FIGS. 10(e) to 10(h) illustrate angular distribution of light from the LED 2.

In FIG. 10, light intensity at an angle in a transverse portion (portion surrounded with dashed line) is strong in both the LED 1 (FIG. 10(a)), and the LED 2 (FIG. 10(e)) in the region "1" which is located at the portion of the V-shaped emission line, and the light is observed as the V-shaped emission line. In addition, since the region "2" is located at the portion of the V-shaped emission line of the LED 2, in the LED 2 (FIG. 10(f)), light intensity at an angle in a transverse portion (portion surrounded with dashed line) is observed to be strong. On the other hand, in the regions "3" and "4" which are not located at the portion of the V-shaped emission line, light intensity at an angle in a transverse portion is observed not to be strong, and is observed as approximately the same light intensity in any angular distribution. Accordingly, it was observed that light which forms the V-shaped emission line is centered on the transverse portion (angle of transverse portion) of the circumference.

As described above, it is confirmed that the V-shaped emission line is caused by angular distribution of input light, or the like, and light with an angle of a transverse portion forms the V-shaped emission line. This is because light with an angle of a transverse portion is emitted to the front from the light emission plane 23b (refer to FIG. 5) in the vicinity of the light input plane 23a.

Specifically, an input angle of light with an angle of a transverse portion with respect to the rear surface 23c of the light guiding body 23 becomes equal to or less than the critical angle between the light guiding body 23 and the low refractive index layer 24 in the vicinity of the light input plane 23a due to roughness on the surface of the light input plane 23a of the light guiding plate 22, an influence of the prism 23e (refer to FIG. 3), or the prism 23i (refer to FIG. 5) which is formed on the light emission plane 23b, and the like. Due to this, the light is input to the low refractive index layer 24, and is reflected toward the front side by the prism 24b (refer to FIG. 3). In addition, the light is emitted to the front from the light emission plane 23b. It is considered that the light forms the V-shaped emission line in the vicinity of the light input plane 23a. That is, it is considered that the V-shaped emission line occurs when light which is not totally reflected on the interface between the light and the low refractive index layer 24 is leaked to the front side.

In contrast to this, as illustrated in FIG. 8, when the inclined plane 30 is formed on the light guiding plate 22, light with an angle of a transverse portion is reflected on the inclined plane 30, and angular distribution thereof is changed. In this manner, input of the light to the low refractive index layer 24 is suppressed (by being totally reflected on interface between light and low refractive index layer 24), and leakage of light from the light emission plane 23b is suppressed. As a result, occurring of the V-shaped emission line is suppressed.

Figure 11:
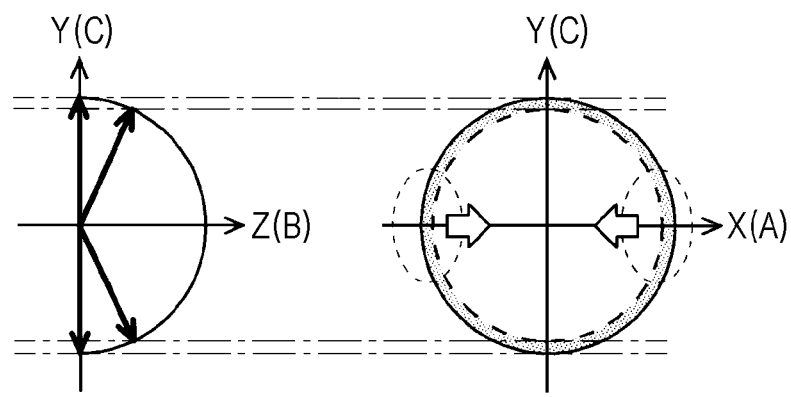
FIG. 11 is a diagram which illustrates angular distribution of emission light from an LED.

Specifically, as illustrated in FIG. 11, for example, among light beams which are emitted from the LED at the angle of $\theta1$ (for example, angle in range of 65° to 90°), light at a transverse portion of the circumference (light at portion surrounded with dashed line in hatched region) forms the V-shaped emission line.

Figure 12:
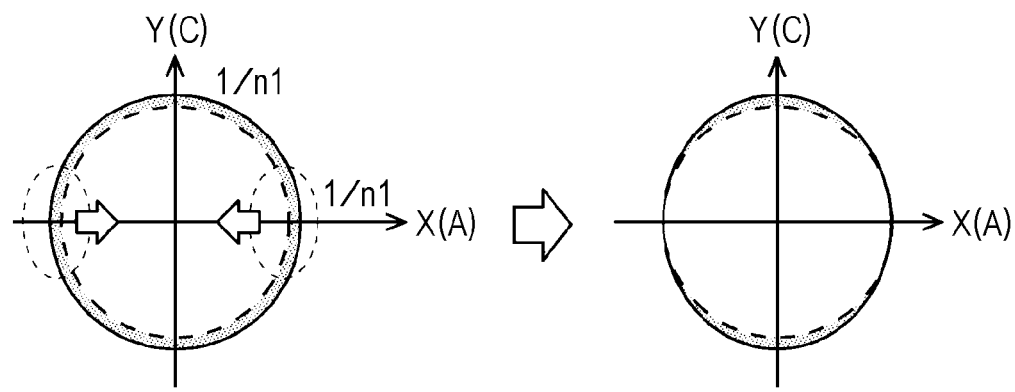
FIG. 12 is a diagram which illustrates angular distribution of light in the light guiding plate.

FIG. 12 illustrates angular distribution in the light guiding plate. FIG. 12(A) illustrates a state in which the light at the transverse portion of the circumference is not reflected on the inclined plane 30 (trapezoidal prism) yet (initial state), and FIG. 12 (B) illustrates a state in which the light at the transverse portion of the circumference has reflected on the inclined plane 30 (after reflecting on inclined plane). As illustrated in FIG. 12, angular distribution of the light is changed when the light at the transverse portion of the circumference is reflected on the inclined plane 30 (refer to FIG. 8). Due to this, the input angle of the light with the angle of the transverse portion with respect to the rear surface 23c (refer to FIG. 3) becomes larger than the critical angle between the light guiding body 23 and the low refractive index layer 24. For this reason, reflecting of the light toward the front side by the prism 24b (refer to FIG. 3) is suppressed in the vicinity of the light input plane 23a. As a result, occurring of the V-shaped emission line is suppressed. In this manner, occurring of the V-shaped emission line is suppressed, and it is possible to effectively use the light, since the light with the angular distribution which forms the V-shaped emission line is changed to the light with angular distribution which does not form the V-shaped emission line by being reflected on the inclined plane 30, by forming the inclined plane 30 (refer to FIG. 8).

Figure 13:
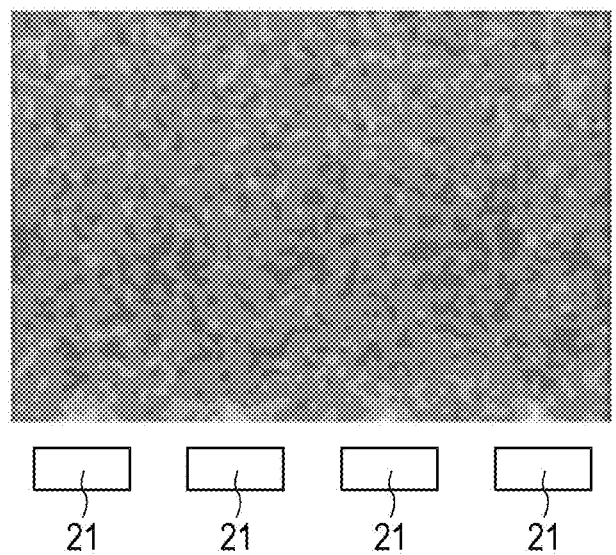
FIG. 13 is a diagram in which emission light (sheet shaped light) from a backlight unit according to an Example is obtained using a simulation.
Figure 14:
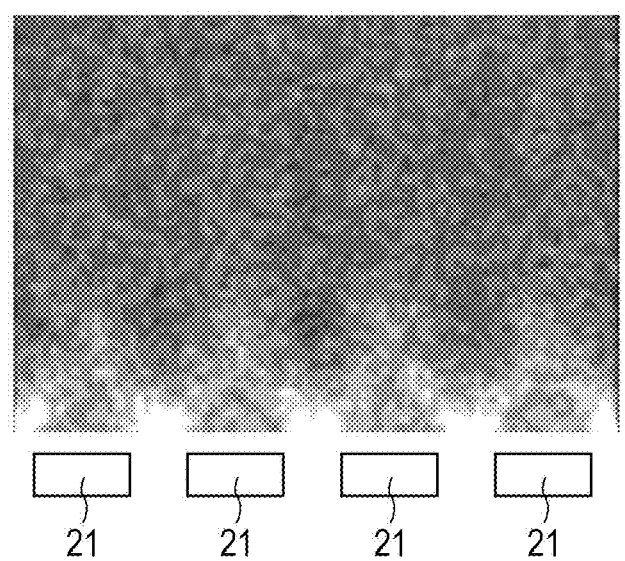
FIG. 14 is a diagram in which emission light (sheet shaped light) from a backlight unit according to a Comparison Example is obtained using a simulation.

Subsequently, an effect of suppressing the V-shaped emission line using the inclined plane 30 (refer to FIG. 8) has been confirmed using a simulation. In the simulation, a configuration which is the same as that in the first embodiment (configuration including inclined plane 30) is set to an Example, and a configuration which is the same as that of the Example except for the fact of not including the inclined plane 30 is set to a Comparison Example. The result is illustrated in FIGS. 13 and 14. As illustrated in FIG. 13, in the Example including the inclined plane 30 (refer to FIG. 8), it is confirmed that the V-shaped emission line is not observed, and sheet-shaped light with high quality, and with no uneven luminance is obtained. In contrast to this, in the Comparison Example illustrated in FIG. 14, a result is obtained in which the V-shaped emission line is observed, and uneven luminance occurs due to the V-shaped emission line. In this manner, it is confirmed that occurring of the V-shaped emission line, and the uneven luminance are suppressed by providing the inclined plane 30 (refer to FIG. 8) on the light guiding plate.

FIGS. 21 to 27 are diagrams for describing manufacturing processes of a light guiding plate of the backlight unit according to the first embodiment. Subsequently, a manufacturing method of the light guiding plate 22 of the backlight unit 20 according to the first embodiment will be described with reference to FIGS. 21 to 27.

Figure 21:
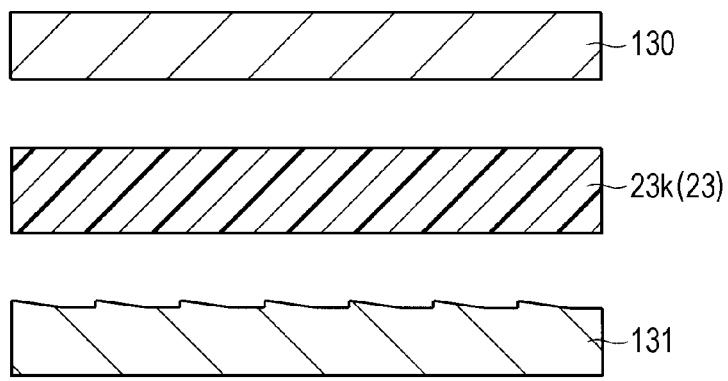
FIG. 21 is a cross-sectional view for describing a manufacturing process of the light guiding plate of the backlight unit according to the first embodiment of the present invention.
Figure 22:
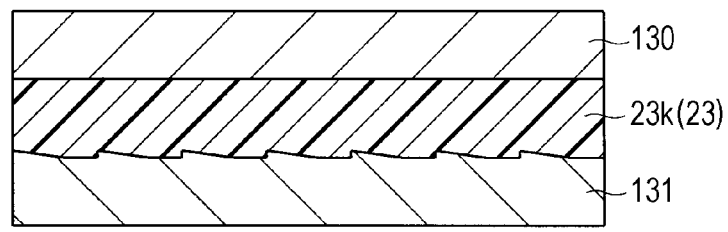
FIG. 22 is a cross-sectional view for describing the manufacturing process of the light guiding plate of the backlight unit according to the first embodiment of the present invention.

First, the light guiding body 23 is formed by an imprint method using heat. Specifically, as illustrated in FIG. 21, a film material 23k which is formed of a transparent resin is arranged between an upper die 130 and a lower die 131. Subsequently, as illustrated in FIG. 22, the film material 23k is heated and pressed by the upper die 130 and lower die 131. In this manner, the film material 23k is formed in a desired shape.

Figure 23:
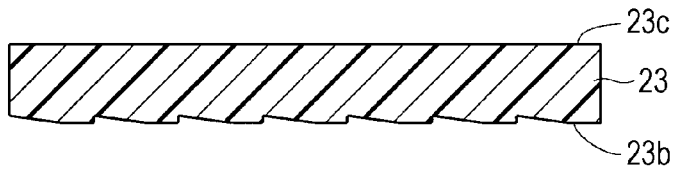
FIG. 23 is a cross-sectional view for describing the manufacturing process of the light guiding plate of the backlight unit according to the first embodiment of the present invention.

In addition, the film material 23k is cooled down by being separated from the upper die 130 and lower die 131, and is divided into a unit piece, thereby obtaining the light guiding body 23, as illustrated in FIG. 23.

In addition, it is also possible to form the light guiding body 23 using injection molding, not the imprint method, however, it is possible to manufacture the light guiding body 23 using a roll-to-roll method, by forming the light guiding body 23 by the imprint method in which the film material 23k is used. In this manner, it is possible to shorten production time, and to reduce production cost.

Figure 24:
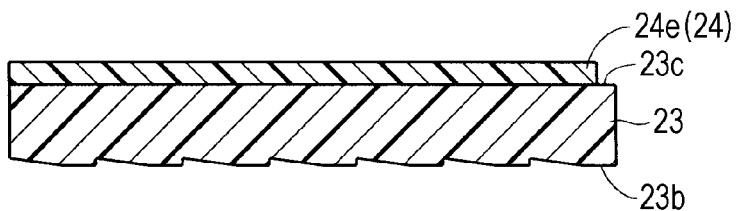
FIG. 24 is a cross-sectional view for describing the manufacturing process of the light guiding plate of the backlight unit according to the first embodiment of the present invention.

Subsequently, the low refractive index layer 24 is formed on the rear surface 23c of the light guiding body 23 using the imprint method, using ultraviolet light (UV light). Specifically, as illustrated in FIG. 24, a UV curable resin 24e which is formed of a transparent resin is applied onto the rear surface 23c of the light guiding body 23. At this time, in the light guiding body 23, since the light emission plane 23b and the rear surface 23c are formed approximately in parallel, it is possible to apply the UV curable resin 24e in a uniform film thickness.

Figure 25:
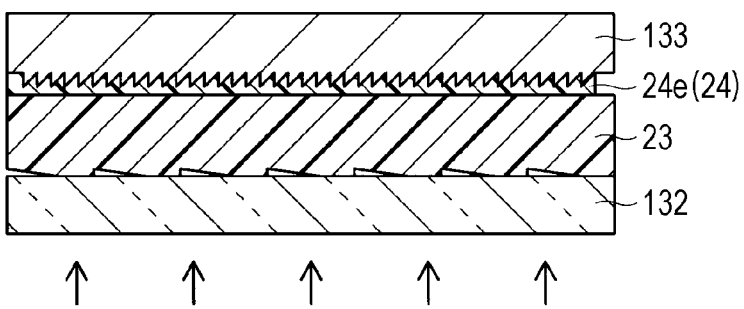
FIG. 25 is a cross-sectional view for describing the manufacturing process of the light guiding plate of the backlight unit according to the first embodiment of the present invention.
Figure 26:
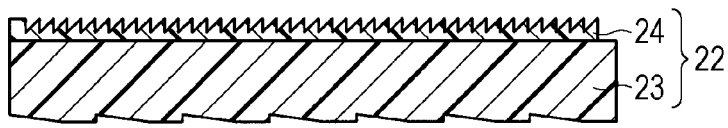
FIG. 26 is a cross-sectional view for describing the manufacturing process of the light guiding plate of the backlight unit according to the first embodiment of the present invention.

In addition, as illustrated in FIG. 25, the light guiding body 23 and the UV curable resin 24e are arranged on a quartz substrate 132, and the light guiding body 23 and the UV curable resin 24e are inserted by the quartz substrate 132 and a die 133. Thereafter, by radiating UV light from the quartz substrate 132 side, the UV curable resin 24e is cured, and becomes the low refractive index layer 24. In this manner, as illustrated in FIG. 26, it is possible to obtain the light guiding plate 22 which is configured by the light guiding body 23 and the low refractive index layer 24 which are formed in desired shapes.

In addition, the roll-to-roll method may be used until the low refractive index layer 24 is formed, and the light guiding plate 22 (light guiding body 23 and low refractive index layer 24) may be divided into a single unit thereafter.

Figure 27:
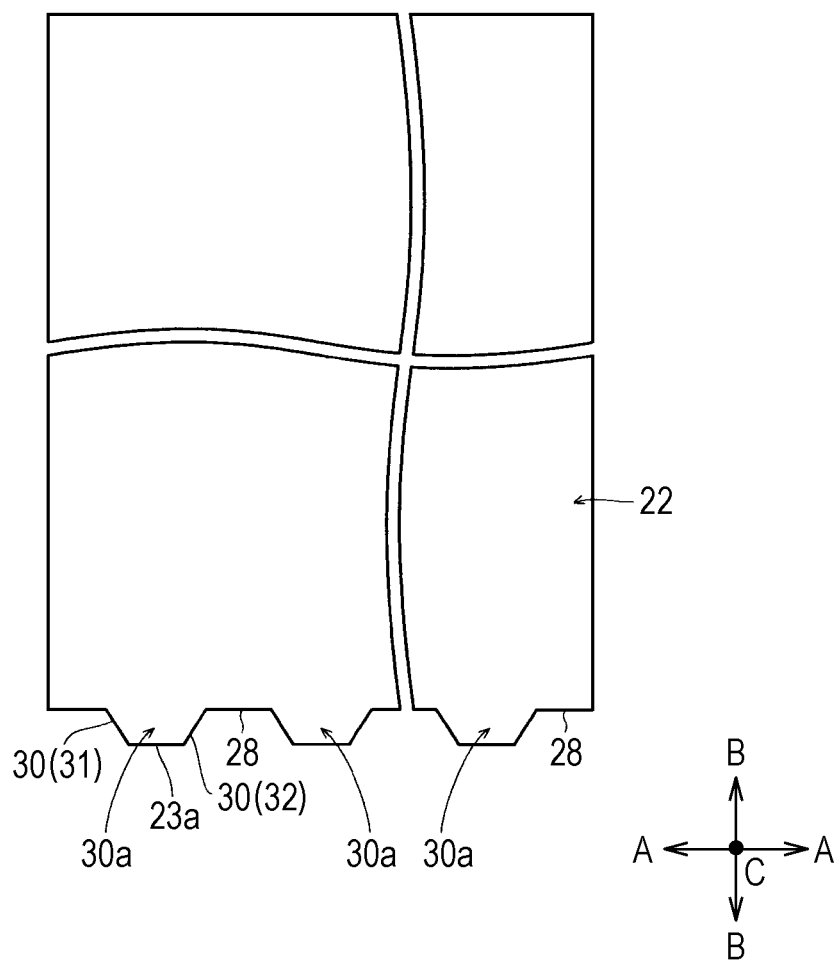
FIG. 27 is a plan view for describing the manufacturing process of the light guiding plate of the backlight unit according to the first embodiment of the present invention.

Thereafter, as illustrated in FIG. 27, the trapezoidal prism 30a (inclined plane 30) is formed at an end portion of the light guiding plate 22 using press working, laser processing (cutting), or the like.

According to the first embodiment, as described above, light from the LED 21 is guided while being repeatedly reflected between the light emission plane 23b and the rear surface 23c of the light guiding body 23, and the input angle of the light with respect to the rear surface 23c of the light guiding body 23 is made gradually small, by providing the plurality of prisms 23e which cause the input angle of light from the LED 21 with respect to the rear surface 23c of the light guiding body 23 to be gradually small on the light emission plane 23b of the light guiding body 23. In addition, when the input angle of the light with respect to the rear surface 23c of the light guiding body 23 becomes smaller than the critical angle between the light guiding body 23 and the low refractive index layer 24, the light from the LED 21 is input to the low refractive index layer 24. For this reason, the flare angle of the light which is input to the low refractive index layer 24 in the B direction becomes small, and the flare angle of the light in the B direction which is reflected on the interface between the rear surface 24a of the low refractive index layer 24 and the air layer also becomes small. That is, it is possible to improve a condensing property of light, and to improve luminance of the liquid crystal display panel 10. As a result, since it is not necessary to provide a plurality of optical sheets such as a condensing lens on the light guiding plate 22, it is possible to make the backlight unit 20 thin, and to suppress an increase in production cost.

In addition, since it is not necessary to provide the plurality of optical sheets, there is no light loss when passing through the optical sheet. Due to this, it is possible to improve use efficiency of light.

In addition, by providing the plurality of prisms 23e which make the input angle of the light with respect to the rear surface 23c of the light guiding body 23 gradually small, the light from the LED 21 is guided while being repeatedly reflected between the light emission plane 23b and the rear surface 23c of the light guiding body 23, the input angle of the light with respect to the rear surface 23c of the light guiding body 23 becomes small while being separated from the LED 21, and the light is easily input to the low refractive index layer 24. Due to this, it is possible to make a light amount which is input to the low refractive index layer 24 uniform, in a portion which is close to the LED 21, and in which the light amount (light flux) is large, and in a portion which is far from the LED 21, and in which the light amount (light flux) is small. As a result, since it is possible to cause light to be further uniformly emitted from the entire region of a light emission region 22a of the light guiding plate 22, the luminance of the liquid crystal display panel 10 can be made uniform.

In addition, according to the first embodiment, by forming the plurality of prisms 24b which cause the light from the LED 21 to be reflected to the front approximately on the entire surface of the rear surface 24a of the low refractive index layer 24 in the light emission region 22a of the light guiding plate 22, it is possible to make light be uniformly reflected on approximately the entire region of the light emission region 22a of the light guiding plate 22 by the plurality of prisms 24b. In this manner, since light can be uniformly emitted from the entire region of the light emission region 22a of the light guiding plate 22, it is possible to suppress occurrence of irregular dots, and to make luminance of liquid crystal display panel 10 more uniform.

In addition, according to the first embodiment, since the plurality of prisms 24b have a function of totally reflecting the light from the LED 21, it is possible to prevent the light which is input to the low refractive index layer 24 from the light guiding body 23 from being emitted from the rear surface 24a of the low refractive index layer 24. In this manner, since occurring of light loss can be suppressed, it is possible to further improve use efficiency of light.

In addition, when providing the inclined plane 30 which is inclined to the optical axis O of the light from the LED 21 in the light guiding plate 22, the input light is reflected in the direction which is close to the optical axis O due to the inclined plane 30. Due to this, it is possible to change light with angular distribution which forms the V-shaped emission line into the light with angular distribution which does not form the V-shaped emission line. Accordingly, since it is possible to suppress occurring of the V-shaped emission line, occurring of uneven luminance which is caused by the V-shaped emission line in the sheet-shaped light which is emitted from the backlight unit 20 can be suppressed. As a result, it is possible to obtain a backlight unit 20 of which luminance is highly uniform. In addition, since light which forms the V-shaped emission line can be effectively used, it is possible to effectively improve use efficiency and luminance of light.

In addition, according to the first embodiment, it is possible to easily suppress occurring of the V-shaped emission line by forming the inclined plane 30 so as to extend in a direction which is inclined to the optical axis O from the light input plane 23a. In this manner, it is possible to easily suppress occurrence of uneven luminance.

In addition, according to the first embodiment, since it is possible to effectively suppress occurring of the V-shaped emission line by configuring the inclined plane 30 so as to include the pair of inclined planes 31 and 32 which are linearly symmetric to the optical axis O, it is possible to further improve uniformity of luminance.

In addition, according to the first embodiment, by forming the trapezoidal convex portion 30a (trapezoidal prism 30a) which protrudes to the LED 21 side at the end portion of the light guiding plate 22, and setting the oblique sides of the trapezoidal convex portion 30a to the inclined plane 30, it is possible to easily form the inclined plane 30 (31 and 32) on the light guiding plate 22. In this manner, it is possible to further easily suppress occurring of the V-shaped emission line.

In addition, according to the first embodiment, by forming the light emission plane 23b and the rear surface 23c of the light guiding body 23 to be approximately parallel to each other, it is possible to easily form the low refractive index layer 24 on the rear surface 23c of the light guiding body 23 compared to a case in which, for example, a wedge-shaped light guiding body of which the rear surface is inclined to a light emission plane is used.

In addition, according to the first embodiment, by providing the inclined plane 23f which is inclined to the light emission plane 23b of the light guiding body 23 in the prism 23e, it is possible to easily make the input angle of the light from the LED 21 with respect to the rear surface 23c of the light guiding body 23 gradually small.

In addition, according to the first embodiment, by making the inclined plane 23f be inclined to the light emission plane 23b of the light guiding body 23 by 5° or less (equal to or greater than 0.1°, and equal to or less than 3°), the input angle of light with respect to the rear surface 23c of the light guiding body 23 becomes small by 10° or less (equal to or greater than 0.2, and equal to or less than 6°), when the light repeats reflecting between the prism 23e and the rear surface 23c. Due to this, it becomes easier to make the input angle of light with respect to the rear surface 23c of the light guiding body 23 small, gradually.

In addition, according to the first embodiment, by forming the planar portion 23d between the prisms 23e which are neighboring in the B direction, it is possible to prevent the light emitted from the light guiding body 23 from being spectrally diffracted.

In addition, according to the first embodiment, since light can be further uniformly reflected due to the plurality of prisms 24b by forming the plurality of prisms 24b consecutively in the B direction without a gap, it is possible to make light be further uniformly reflected from the entire region of the light emission region 22a of the light guiding plate 22. In this manner, it is possible to make luminance of the liquid crystal display panel 10 more uniform.

In addition, according to the first embodiment, since it is possible to make light be further effectively reflected due to the plurality of prisms 24b by forming the plurality of prisms 24b in the same shape, and in the same size as each other, the light can be caused to be further uniformly reflected from the entire region of the light emission region 22a of the light guiding plate 22.

In addition, according to the first embodiment, since the light can be caused to be diffused in the light guiding body 23 in the A direction by forming the plurality of prisms 23i which cause the light from the LED 21 to be diffused in the A direction on the light emission plane 23b of the light guiding body 23, it is possible to make luminance in a front portion of the LED 21 of the liquid crystal display panel 10, and luminance in portions excluding the front portion of the LED 21 of the liquid crystal display panel 10 uniform. That is, it is possible to make luminance of the liquid crystal display panel 10 more uniform.

In addition, by forming the plurality of prisms 23i which cause the light from the LED 21 to be diffused in the A direction, and by causing light of which the input angle with respect to the rear surface 23c of the light guiding body 23 is large when viewed from the light input plane 23a side of the light guiding body 23 to be reflected on the prism 23i, it is possible to make the input angle with respect to the rear surface 23c of the light guiding body 23 small. Due to this, since the light which is input to the low refractive index layer 24 can be prevented from being diffused in the A direction, it is possible to prevent light which is emitted from the light guiding plate 22 from being diffused in the A direction. As a result, it is possible to improve a condensing property of light in the A direction, and to further improve luminance of the liquid crystal display panel 10.

In addition, according to the first embodiment, the light from the LED 21 can be diffused on both sides in the A direction by the pair of inclined planes 23j. By forming the prism 23i using the pair of inclined planes 23j, it is possible to make luminance of the liquid crystal display panel 10 more uniform.

In addition, according to the first embodiment, it is possible to make the inclination angle of the prism 23i (make vertical angle small) large by making the width W3 of the planar portion 23h in the A direction be equal to or less than the size of the width W4 of the prism 23i in the A direction. In addition, since diffusion of light in the A direction can be suppressed by making the inclination angle of the prism 23i large (make vertical angle small), it is possible to further prevent the light which is input to the low refractive index layer 24 from being diffused in the A direction, and to further improve a condensing property of the light in the A direction.

In addition, when the LED 21 is used as a light source, as described above, it is particularly effective when providing the plurality of prisms 23i which cause light from the LED 21 to be diffused in the A direction, since luminance at the front portion of the LED 21 of the liquid crystal display panel 10, and luminance at portions excluding the front portion of the LED 21 of the liquid crystal display panel 10 are likely to be different.

Second Embodiment

Figure 28:
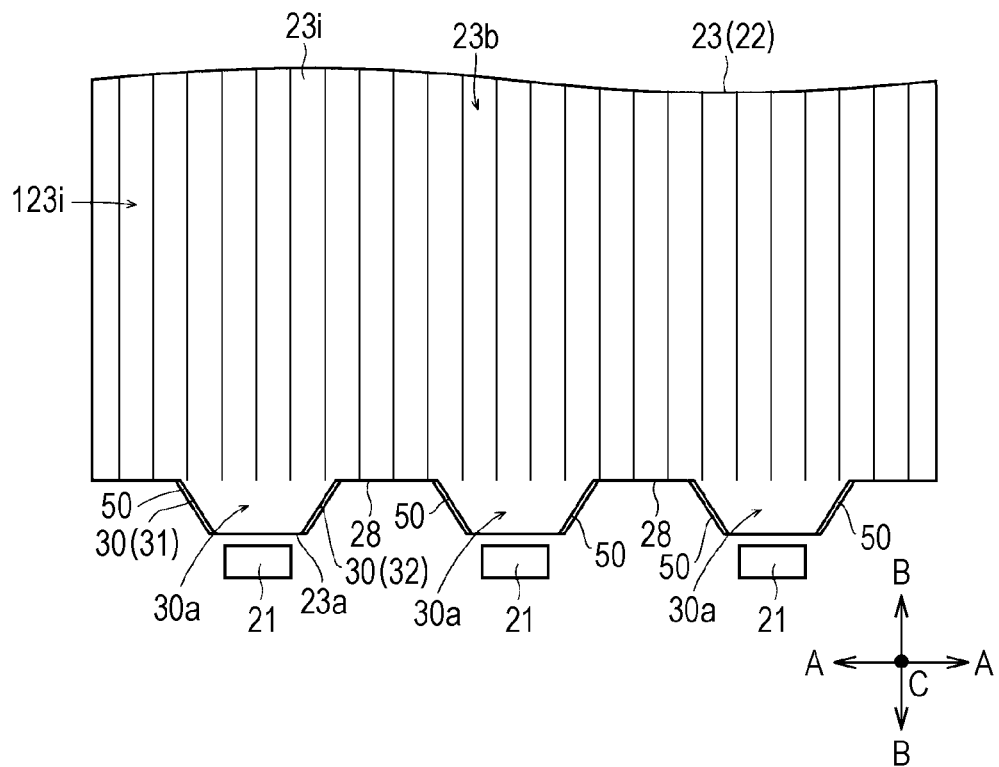
FIG. 28 is a plan view which illustrates a part of a backlight unit according to a second embodiment of the present invention.
Figure 29:
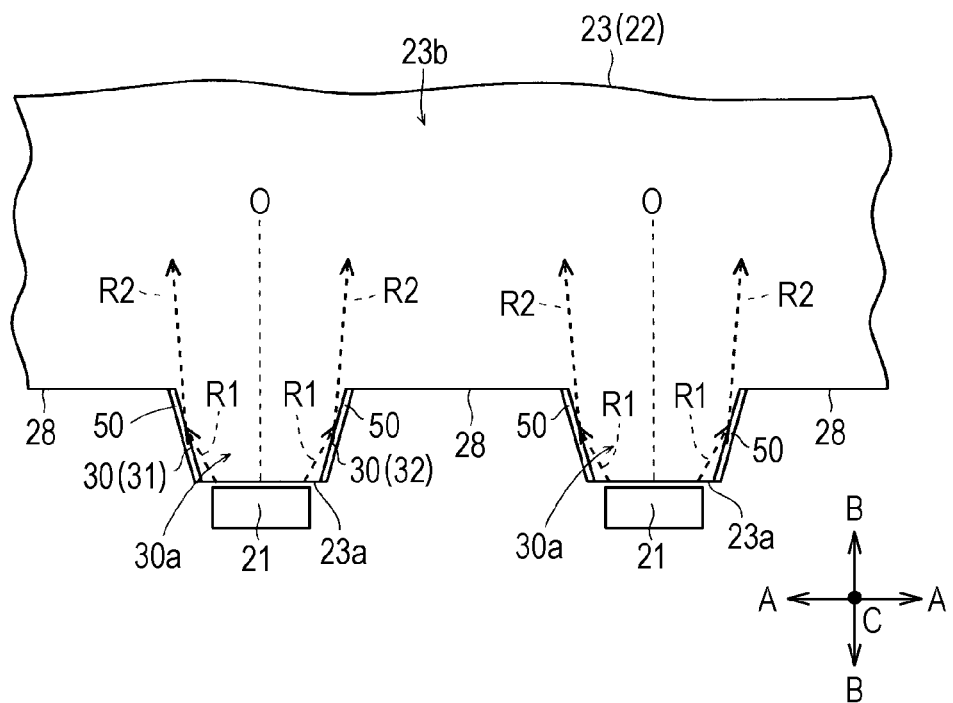
FIG. 29 is a plan view which illustrates FIG. 28 by enlarging a part thereof.
Figure 30:
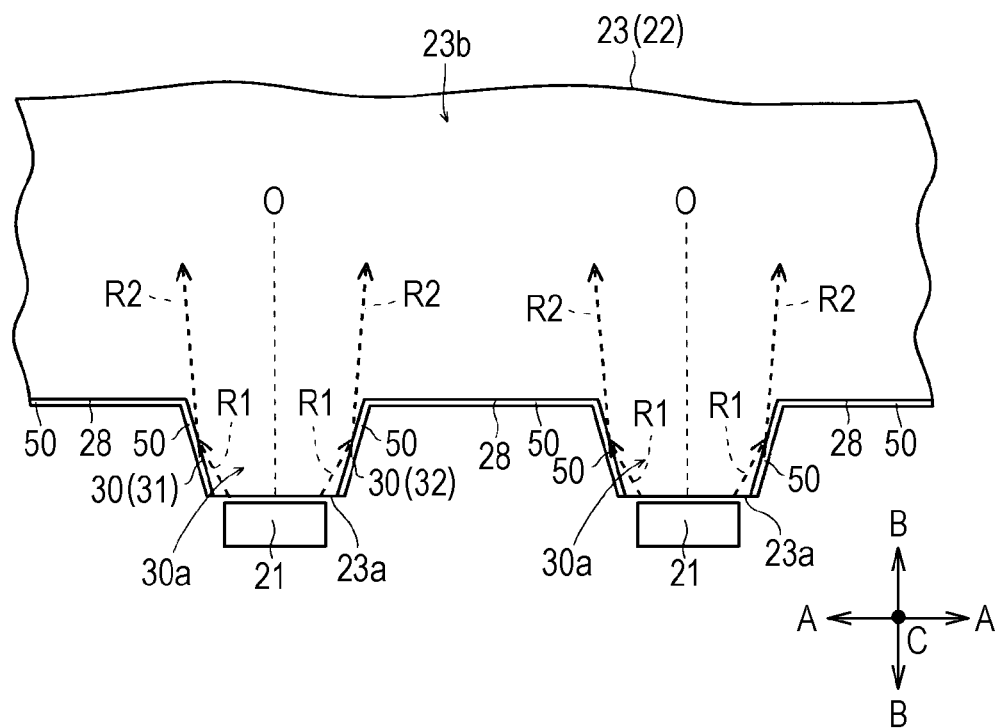
FIG. 30 is a plan view which illustrates another example of the second embodiment.

FIG. 28 is a plan view which illustrates a part of a backlight unit according to a second embodiment of the present invention. FIG. 29 is a plan view which illustrates FIG. 28 by enlarging a part thereof. FIG. 30 is a plan view which illustrates another example of the second embodiment. Subsequently, the backlight unit according to the second embodiment of the present invention will be described with reference to FIGS. 28 to 30. In addition, in each figure, corresponding constitutional elements are given the same reference numerals, and repeated descriptions will be appropriately omitted.

In the backlight unit according to the second embodiment, as illustrated in FIGS. 28 and 29, reflection processing is performed on the outer surface side of the inclined plane 30 of the light guiding plate 22 in the configuration of the first embodiment. Specifically, for example, mirror processing is performed on the outer surface of the inclined plane 30. Due to this, a reflecting layer 50 due to reflection processing such as the mirror processing is formed on the outer surface of the inclined plane 30.

In this manner, according to the second embodiment, it is possible to remove component of transmission light on the inclined plane 30, and to improve use efficiency of light by performing the reflection processing such as the mirror processing on the outer surface of the inclined plane 30.

In addition, as illustrated in FIG. 30, the reflection processing (mirror processing) may be performed also on the end surface 28 of the LED 21 side of the light guiding plate 22, in addition to the outer surface of the inclined plane 30. In addition, reflection processing excluding the mirror processing may be performed on the outer surface of the inclined plane 30.

Other configurations and effects in the second embodiment excluding that are the same as those in the first embodiment.

Third Embodiment

Figure 31:
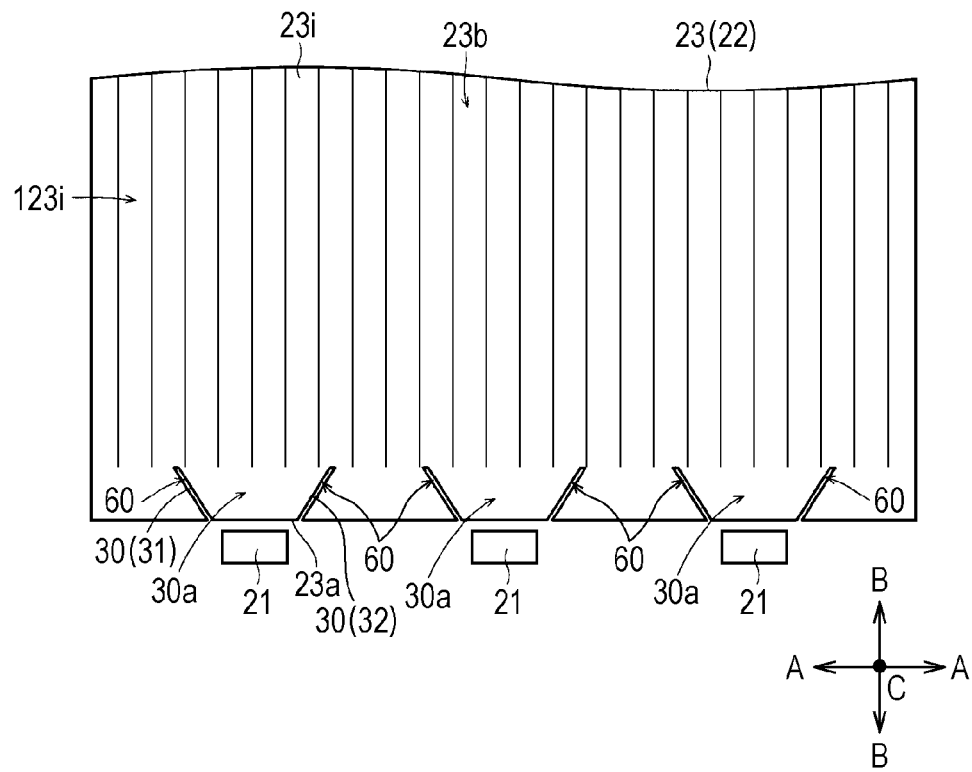
FIG. 31 is a plan view which illustrates a part of a backlight unit according to a third embodiment of the present invention.

FIG. 31 is a plan view which illustrates a part of a backlight unit according to a third embodiment of the present invention.

Figure 32:
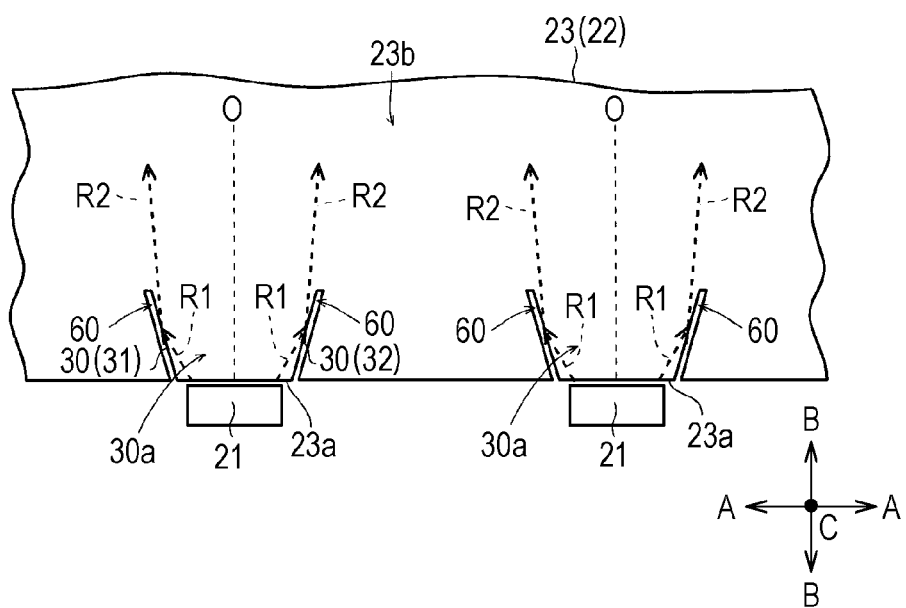
FIG. 32 is a plan view which illustrates FIG. 31 by enlarging a part thereof.

FIG. 32 is a plan view which illustrates FIG. 31 by enlarging a part thereof. Subsequently, the backlight unit according to the third embodiment of the present invention will be described with reference to FIGS. 31 and 32. In addition, in each figure, corresponding constitutional elements are given the same reference numerals, and repeated descriptions will be appropriately omitted.

In the backlight unit according to the third embodiment, as illustrated in FIGS. 31 and 32, a notch portion 60 is formed at an end portion of a light guiding plate 22 on an LED 21 side (vicinity of light input plane 23a). In addition, an air interface is formed by the notch portion 60, and an inclined plane 30 which causes light R1 from an LED 21 (refer to FIG. 32) to be reflected is formed.

Other configurations of the third embodiment excluding that are the same as those in the first embodiment.

According to the third embodiment, processing of the inclined plane 30 becomes easy by forming the notch portion 60 on a light guiding plate 22 as described above, and forming the inclined plane 30 using the notch portion 60.

Other effects of the third embodiment excluding that are the same as those in the first embodiment.

In addition, embodiments which are disclosed at this time are examples in all respects, and are not limiting to the invention. The scope of the present invention is disclosed by the description of the scope of claims, not the descriptions of the above described embodiments, and further includes equivalent meanings to the description of the scope of claims, and all of changes in the scope.

For example, in the above described embodiments, an example in which a backlight unit is applied as a lighting system has been described, however, the present invention is not limited to this, and may be applied to another lighting system excluding the backlight unit.

In addition, in the above described embodiments, an example in which a liquid crystal display panel and a liquid crystal display device are applied as a display panel and a display device, respectively, has been described, however, the present invention is not limited to this, and may be applied to another display panel and display device excluding the liquid crystal display panel and liquid crystal display device.

Figure 33:
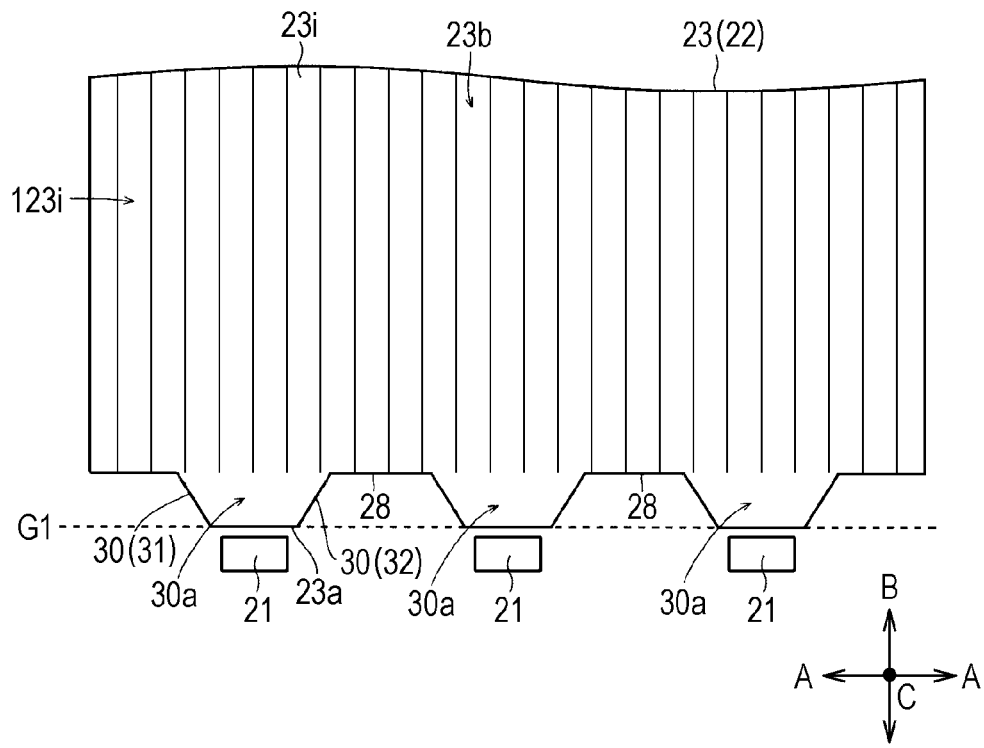
FIG. 33 is a plan view which illustrates a part of a backlight unit according to a first modification example of the present invention (diagram for describing formation region of prism which causes the light to be diffused in horizontal direction).
Figure 34:
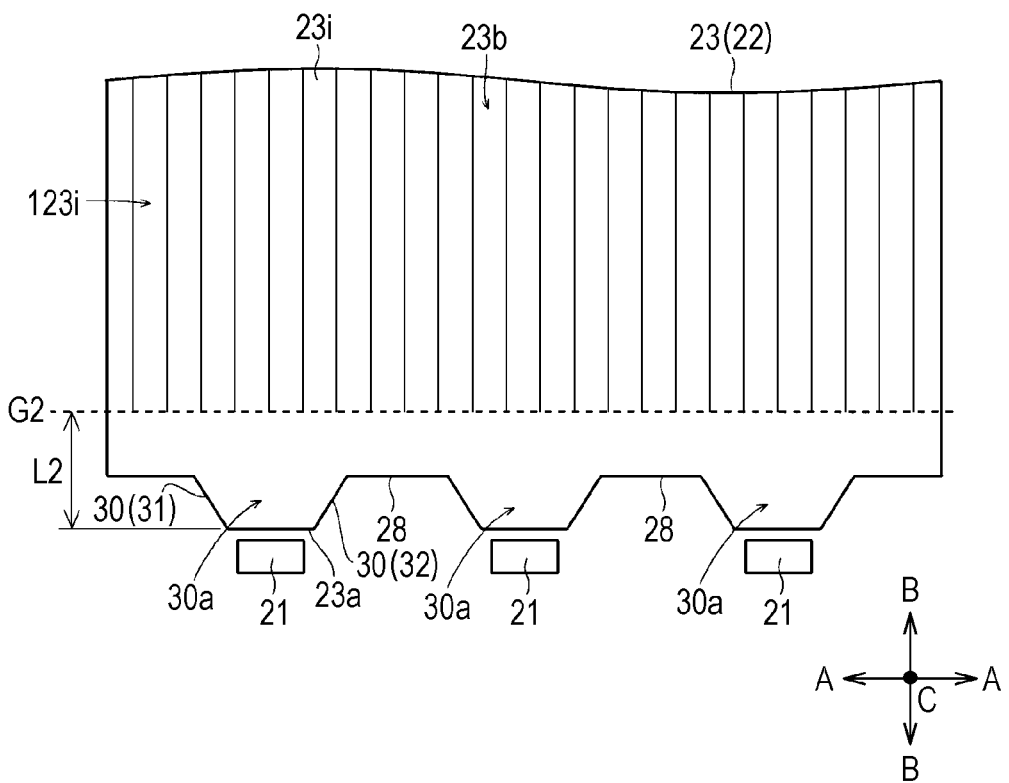
FIG. 34 is a plan view which illustrates a part of a backlight unit according to a second modification example of the present invention (diagram for describing formation region of prism which causes the light to be diffused in horizontal direction).

In addition, in the above described embodiments, an example in which a formation region of a prism which causes light to be diffused in the transverse direction is set to an inclined plane (trapezoidal prism) has been described, however, the present invention is not limited to this, a formation region 123i of the prism may be set to the light input plane 23a (dotted line G1), as illustrated in FIG. 33, for example, and may be set to a position which is separated from the light input plane 23a by a predetermined distance L2 (for example, approximately 2 mm) (dotted line G2), as illustrated in FIG. 34. In addition, the distance L2 can be optimized between 0 mm and approximately 5 mm depending on a structure, for example.

Figure 35:
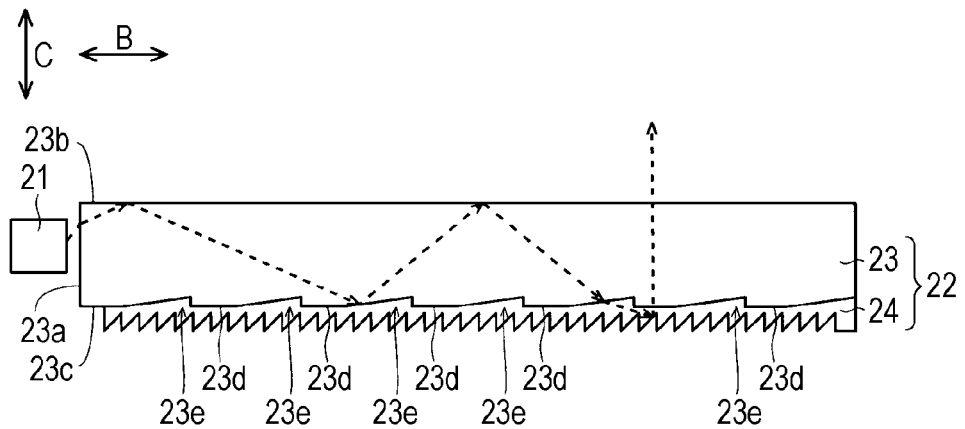
FIG. 35 is a cross-sectional view which schematically illustrates a backlight unit according to a third modification example of the present invention.
Figure 36:
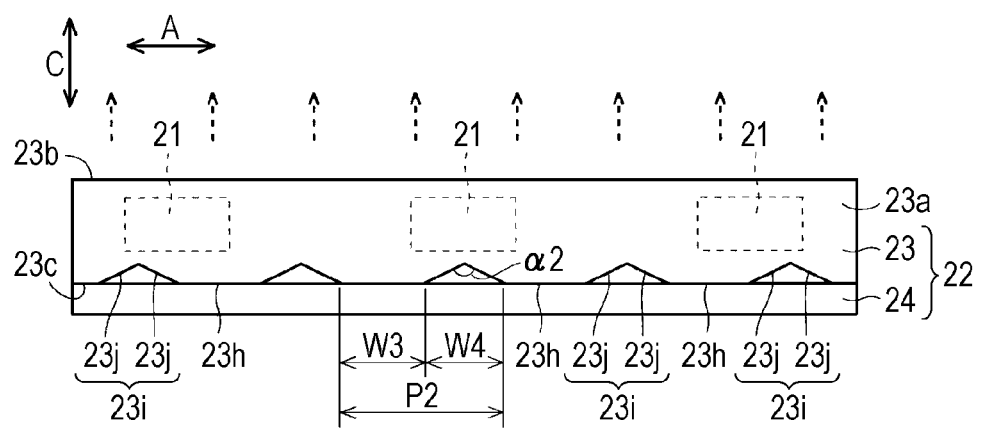
FIG. 36 is a cross-sectional view which schematically illustrates a backlight unit according to a fourth modification example of the present invention.

In addition, in the above described embodiments, an example in which a prism which makes an input angle of light from an LED with respect to the rear surface of a light guiding body gradually small, and a prism which makes light be diffused in the transverse direction are formed on a light emission plane (front face) of the light guiding body has been described, however, the present invention is not limited to this, and the prisms may be formed at other places than the light emission plane (front face) of the light guiding plate. For example, as illustrated in FIG. 35, the prism 23e which makes the input angle of light from the LED 21 with respect to the rear surface 23c of the light guiding body 23 gradually small may be formed on the rear surface 23a of the light guiding body 23. In addition, as illustrated in FIG. 36, the prism 23i which causes light to be diffused in the transverse direction may be formed on the rear surface 23c of the light guiding body 23. In addition, both the prisms 23e and 23i may be formed on the rear surface 23c of the light guiding body 23, and any one of the prisms may be formed on the rear surface 23c of the light guiding body 23.

Figure 37:
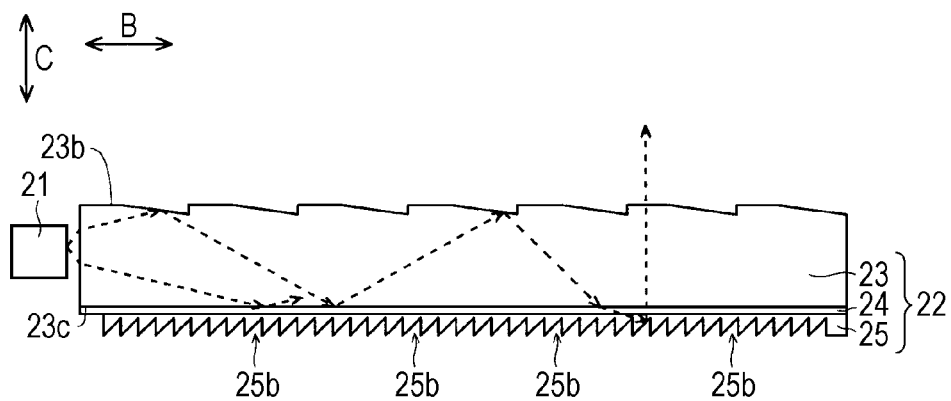
FIG. 37 is a cross-sectional view which schematically illustrates a backlight unit according to a fifth modification example of the present invention.

In addition, in the above described embodiments, an example in which a low refractive index layer is formed on the rear surface of the light guiding body has been described, however, the present invention is not limited to this, and another layer may be formed on the rear surface of the light guiding body, in addition to the low refractive index layer. That is, it may be a structure in which the low refractive index layer is interposed between the light guiding body and another layer. For example, as illustrated in FIG. 37, another layer 25 of which refractivity is different may be formed on a plane which is the opposite side to the light guiding body 23, and the side of the low refractive index layer 24 which is opposite to the light guiding body 23. In this case, it is preferable that a relationship of n2<n3≤n1 be established among the refractivity of the light guiding body 23 (n1), the refractivity of the low refractive index layer 24 (n2), and refractivity of the layer 25 (n3). In addition, in this case, a prism 25b which is similar to the prism formed on the low refractive index layer 24 according to the embodiment may be formed on another layer 25.

In addition, in the above described embodiments, a configuration in which the width of the light input plane in the A direction becomes larger than that of the LED is exemplified, however, the present invention is not limited to this, and it may be a configuration in which the width of the light input plane in the A direction is set to the same as that of the LED, or is set to be smaller than that of the LED. However, it is preferable that the width of the light input plane in the A direction be set to be larger than that of the LED, as described in the embodiments, in order to make light from the LED be effectively input into the light guiding plate from the light input plane.

In addition, in the above described embodiments, an example in which the inclined plane (trapezoidal prism) in the vicinity of the light input plane of the light guiding plate is linearly formed when viewed planarly has been described, however, the present invention is not limited to this, and the inclined plane may be a curved shape when planarly viewed. In addition, the inclined plane may be a linear shape which is bent in multiple stages (for example, two stages). In addition, since the inclined plane is provided in order to make light be reflected, a shape of the inclined plane, or the like, is not particularly limited in a portion of the inclined plane on which light is not reflected (portion to which light is not input). That is, a shape, or the like, of a portion to which light is not input may have any shape. In addition, it is preferable that the inclined plane be symmetric to the optical axis, however, the inclined plane may be non-symmetric to the optical axis when it is possible to improve uneven luminance by suppressing occurring of the V-shaped emission line.

In addition, in the above described embodiments, an example in which a prism which makes an input angle of light from the LED with respect to the rear surface of the light guiding body gradually small, and a prism which makes light be diffused in the transverse direction are formed in concave shapes, respectively, has been described, however, the present invention is not limited to this, and the prisms may be formed in other shapes (for example, convex shape) than the concave shape.

Figure 38:
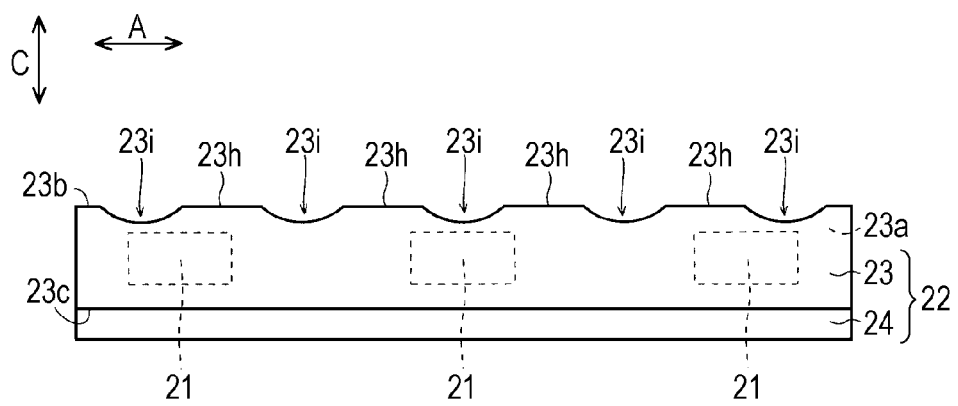
FIG. 38 is a cross-sectional view which schematically illustrates a backlight unit according to a sixth modification example of the present invention.

In addition, in the above described embodiments, an example in which a prism which causes light to be diffused in the transverse direction is formed so as to have a triangular shape in a cross section thereof has been described, however, the invention is not limited to this, and the shape of the prism may be other shapes than the triangular shape in the cross section thereof. For example, as illustrated in FIG. 38, the cross section of the prism 23i which causes light to be diffused in the transverse direction may be formed in an arc shape.

In addition, in the above described embodiments, it may be a configuration in which a reflecting plate is provided on the rear surface side of the light guiding plate. A configuration of the reflecting plate is not particularly limited, however, for example, it is preferable that the reflecting plate be formed by any one of a reflecting plate which is configured of a dielectric multilayer mirror, a reflecting plate on which silver is coated, and a reflecting plate which is formed of a white PET resin. In addition, it may be a configuration in which a diffusing plate which causes light to be diffused is provided between the light guiding plate and the display panel.

In addition, in the above described embodiments, an example in which the LED is used as a light source has been described, however, the present invention is not limited to this. As the light source, other light emitting elements excluding the LED may be used, or other light sources excluding the light emitting element (for example, CCFL, or the like) may be used.

In addition, values of an angle, the width, and the like, which are described in the above described embodiments are examples, and an angle, the width, and the like, may be formed using values which are different from those in the above described embodiments.

In addition, in the above described embodiments, an example in which the prism is formed using a planar die and quartz substrate, when forming the light guiding plate has been described, however, the present invention is not limited to this. The prism may be formed using a roll-shaped die and quartz substrate, when forming the light guiding plate.

In addition, in the above described embodiments, an example in which a prism is formed in the light guiding body by an imprint method using heat, and then the low refractive index layer is formed in the light guiding body has been described, however, the present invention is not limited to this. For example, the prism may be formed after forming the low refractive index layer in the light guiding body.

Figure 39:
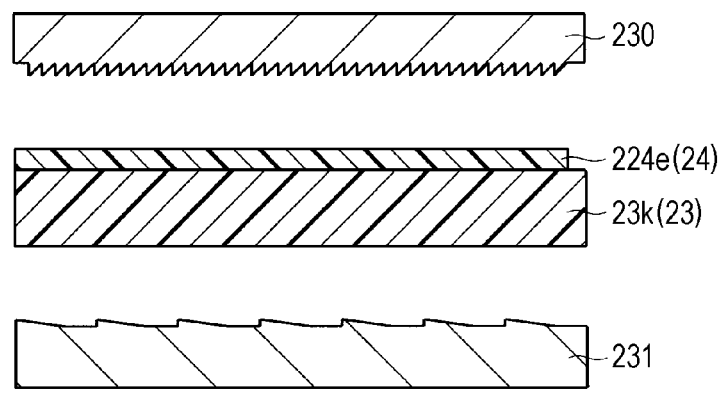
FIG. 39 is a cross-sectional view for describing another manufacturing process of the light guiding plate of the backlight unit.
Figure 40:
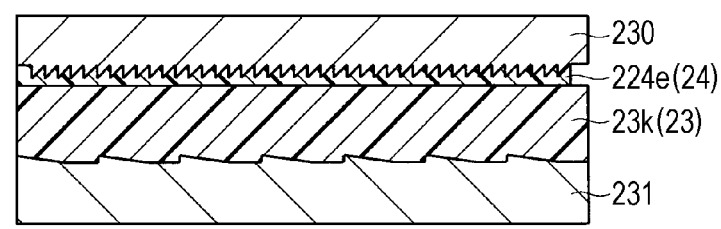
FIG. 40 is a cross-sectional view for describing another manufacturing process of the light guiding plate of the backlight unit.
Figure 41:
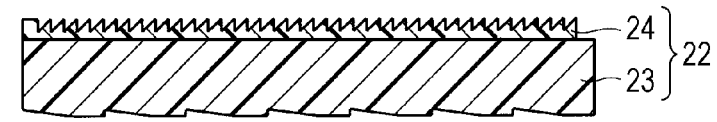
FIG. 41 is a cross-sectional view for describing another manufacturing process of the light guiding plate of the backlight unit.

Specifically, first, as illustrated in FIG. 39, a film material 224e as the low refractive index layer 24 is laminated on the film material 23k as the light guiding body 23. Subsequently, the film material 23k and the film material 224e are arranged between an upper die 230 and a lower die 231. In addition, as illustrated in FIG. 40, the film material 23k and the film material 224e are heated and pressed using the upper die 230 and the lower die 231. In this manner, the film material 23k and the film material 224e are formed in desired shapes. It is possible to obtain the light guiding plate 22 which is formed by the light guiding body 23 and the low refractive index layer 24 as illustrated in FIG. 41, by separating the film material 23k and the film material 224e from the upper die 230 and the lower die 231, cooling down, and dividing the film materials into a single unit after that.

In addition, embodiments which are obtained by appropriately combining the above disclosed technology are also included in the technical range of the present invention.

INDUSTRIAL APPLICABILITY

According to the present invention, it is possible to use a lighting system on which a light guiding member which guides light is mounted, and a display device which includes the lighting system.

REFERENCE SIGNS LIST

1 LIQUID CRYSTAL DISPLAY DEVICE (DISPLAY DEVICE)
10 LIQUID CRYSTAL DISPLAY PANEL (DISPLAY PANEL)
11 ACTIVE MATRIX SUBSTRATE
12 OPPOSING SUBSTRATE
13 POLARIZING FILM
21 LED (LIGHT SOURCE)
20 BACKLIGHT UNIT (LIGHTING SYSTEM)
22 LIGHT GUIDING PLATE (LIGHT GUIDING MEMBER)
22a LIGHT EMISSION REGION
23 LIGHT GUIDING BODY
23a LIGHT INPUT PLANE
23b LIGHT EMISSION PLANE (FRONT FACE)
23c REAR SURFACE
23d PLANAR PORTION
23e PRISM (FIRST REFLECTING UNIT)
23f INCLINED PLANE
23g VERTICAL PLANE
23h PLANAR PORTION
23i PRISM
23j INCLINED PLANE
23k FILM MATERIAL
24 LOW REFRACTIVE INDEX LAYER
24a REAR SURFACE
24b PRISM (SECOND REFLECTING UNIT)
24c INCLINED PLANE
24d VERTICAL PLANE
24e CURABLE RESIN
28 END SURFACE
30 INCLINED PLANE
30a CONVEX PORTION, TRAPEZOIDAL PRISM
31 INCLINED PLANE (FIRST INCLINED PLANE)
32 INCLINED PLANE (SECOND INCLINED PLANE)
50 REFLECTING LAYER (REFLECTION PROCESSING)
60 NOTCH PORTION

The invention claimed is:

1. A lighting system comprising:
a light source; and
a light guiding member for guiding light from the lighting source,
wherein the light guiding member includes a light guiding body to which light from the light source is input, a low refractive index layer which is provided on a rear surface of the light guiding body without an air layer, and of which a refractive index is lower than that of the light guiding body, and an inclined plane which is inclined to an optical axis of the light from the light source,
wherein a plurality of first reflecting units which make an input angle of the light from the light source with respect to the rear surface of the light guiding body gradually small are provided on a front face side, or the rear surface of the light guiding body,
wherein a plurality of second reflecting units which cause the light from the light source to be totally reflected forward in an interface between the rear surface of the light guiding member and an air layer are provided on the rear surface of the light guiding member, and
wherein the inclined plane causes the input light to be reflected in a direction which is close to an optical axis.

2. The lighting system according to claim 1,
wherein the light guiding member includes an input plane to which light from the light source is input, and
wherein the inclined plane extends in a direction which is inclined to the optical axis from the input plane.

3. The lighting system according to claim 1,
wherein the inclined plane includes a first inclined plane and a second inclined plane which are linearly symmetric to the optical axis.

4. The lighting system according to claim 1,
wherein the light guiding member includes a convex portion which protrudes to the light source side,
wherein the convex portion is formed in a trapezoidal shape when viewed planarly, and
wherein oblique sides of the trapezoidal convex portion are the inclined planes.

5. The lighting system according to claim 1,
wherein an end portion of the light guiding member on the light source side is formed with a notch portion, and
wherein the inclined plane which causes input light to be reflected in a direction which is close to the optical axis is formed by the notch portion.

6. The lighting system according to claim 1,
wherein the light guiding member includes the input plane to which light from the light source is input, and
wherein width of the input plane is larger than that of a light emitting unit of the light source.

7. The lighting system according to claim 1,
wherein reflection processing is performed on an outer surface side of the inclined plane.

8. The lighting system according to claim 1,
wherein an inclination angle of the inclined plane is set so that reflected light is parallel to the optical axis.

9. The lighting system according to claim 1,
wherein a front face and the rear surface of the light guiding body are formed so as to be approximately parallel to each other.

10. A display device comprising:
the lighting system according to claim 1; and
a display panel which receives light from the lighting system.

* * * * *